(12) United States Patent
Nishio

(10) Patent No.: US 8,375,214 B2
(45) Date of Patent: Feb. 12, 2013

(54) INFORMATION PROCESSING APPARATUS, INFORMATION PROCESSING METHOD, AND PROGRAM THEREFOR

(75) Inventor: Masahiro Nishio, Higashiyamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 1554 days.

(21) Appl. No.: 11/140,446

(22) Filed: May 27, 2005

(65) Prior Publication Data

US 2005/0273616 A1 Dec. 8, 2005

(30) Foreign Application Priority Data

Jun. 4, 2004 (JP) ................................. 2004-167537

(51) Int. Cl.
*H04L 9/32* (2006.01)
*H04L 29/06* (2006.01)
*G06F 11/30* (2006.01)
*G06F 12/14* (2006.01)
*G06F 15/16* (2006.01)

(52) U.S. Cl. ........ 713/176; 713/152; 713/190; 713/193; 726/14; 709/204; 709/205; 709/206; 709/207

(58) Field of Classification Search .................. 713/152, 713/176, 190, 193; 726/14; 709/204–207
See application file for complete search history.

(56) References Cited

U.S. PATENT DOCUMENTS

| | | | | |
|---|---|---|---|---|
| 5,721,781 A | * | 2/1998 | Deo et al. ........................ | 705/67 |
| 5,825,878 A | * | 10/1998 | Takahashi et al. ............. | 713/190 |
| 6,585,778 B1 | * | 7/2003 | Hind et al. ..................... | 715/235 |
| 6,931,532 B1 | * | 8/2005 | Davis et al. .................... | 713/167 |
| 7,444,675 B2 | * | 10/2008 | Beringer et al. ................ | 726/14 |
| 2002/0051543 A1 | * | 5/2002 | Lenstra et al. ................. | 380/277 |
| 2002/0143855 A1 | * | 10/2002 | Traversat et al. ............. | 709/202 |
| 2003/0154413 A1 | * | 8/2003 | Shigeeda ....................... | 713/202 |
| 2004/0010570 A1 | * | 1/2004 | Kaler et al. .................... | 709/220 |
| 2004/0186998 A1 | * | 9/2004 | Kim et al. ...................... | 713/169 |
| 2005/0081039 A1 | * | 4/2005 | Lee et al. ....................... | 713/176 |
| 2006/0265689 A1 | * | 11/2006 | Kuznetsov et al. ........... | 717/117 |

FOREIGN PATENT DOCUMENTS

JP 7-87077 A 3/1995

OTHER PUBLICATIONS

Takahiro Sugiyama, "XML Signature", Information Knowledge Society Publication, Vo. 12, No. 3, pp. 53 to 60.
Takahiro Sugiyama et al., "XML Signature Base Technology in Electronic Government Project", NEC Technoogy publication, vol. 53, No. 12, Pates 53 to 56, NEC.
Jun Ota et al, "The Second Message Protocol Specification 'SOAP'", Java WORLD, vol. 7, No. 12, pp. 155 to 162, IDG Japan Ltd.

* cited by examiner

*Primary Examiner* — Edan Orgad
*Assistant Examiner* — Kari Schmidt
(74) *Attorney, Agent, or Firm* — Canon U.S.A., Inc., IP Division

(57) ABSTRACT

An information processing apparatus includes a storage unit that stores security processing information describing a security processing procedure that is to be executed on data handled by a service providing program and including data written in a structured language; and a security processing unit that executes security processing to encrypt or sign the data handled by the service providing program, with reference to the security processing information stored in the storage unit, so that the service providing program can communicate securely with an external service providing program.

17 Claims, 18 Drawing Sheets

FIG. 4

```xml
<!xml version="1.0" encoding="UTF-8">
<XMLScript>     401
   <ApplicationID>ApplicationName</ApplicationID>
      <EncryptedData>~402
         <EncryptionTarget mode="ALL" | "ELEMENT" | "CONTENTS">~403
            "element name"
         </EncrypionTarget>
         <KeyInfo>~404
            <SymmetricKeyInfo>~405
               <EncryptionMethod>~406
                        3DES-CBC | AES128-CBC | AES256-CBC
               </EncryptionMethod>
               <KeyValue>~407
                  AkBuaoKKahseJJkA......
               </KeyValue>
            </SymmetricKeyInfo>
            <PublicKeyInfo>~408
               <EncryptionMethod>~409
                        RSA-PKCSv1.5 | RSA-OAEP
               </EncryptionMethod>
               <RetrievalMethod>~410
                        URI to indicate the location of key
               </RetrievalMethod>
         411~<KeyValue>AyNNMoHyase......</KeyValue>
            </PublicKeyInfo>
            <CipherData>~412
                  <CipherValue>ToMoSSmakJSbKMMoS...</CipherValue>
            </CipherData>
         </KeyInfo>
      </EncryptedData>
</XMLScript>
```

FIG. 7

```
<s:Envelope
    xmlns:s="http://schemas.xmlsoap.org/soap/envelope/"
    s:encodingStyle="http://schemas.xmlsoap.org/soap/encoding/">
  <s:Body>
      <MaintenanceRequest>―701
            <UserID>myname</UserID>―702
       703―<DeviceName>ABCD Printer</DeviceName>
            <CounterValue>―704
                  <A4>123456</A4>
                  <A3>4321</A3>
            </CounterValue>
            <TonerStatus>―705
                  <Cyan>FULL</Cyan>
                  <Magenta>FULL</Magenta>
                  <Yellow>MIDDLE</Yellow>
                  <Black>LOW</Black>
            </TonerStatus>
            <ErrorLog>―706
                  <ErrorStatus>―707
                        <Time>2003-12-13T01:23:34Z</Time>
                        <ErrorCode>DoorOpen</ErrorCode>
                  </ErrorStatus>
                  <ErrorStatus>―707
                        <Time>2003-12-13T01:01:12Z</Time>
                        <ErrorCode>PaperJam</ErrorCode>
                  </ErrorStatus>
            </ErrorLog>
      </MaintenanceRequest>
  </s:Body>
</s:Envelope>
```

FIG. 10

```
<s:Envelope
    xmlns:s="http://schemas.xmlsoap.org/soap/envelope/"
    s:encodingStyle="http://schemas.xmlsoap.org/soap/encoding/">
  <s:Header>
        <Security>
          <EncryptedKey>
              <EncryptionMethod Algorithm='http://www.w3.org/2001/04/
                  xmlenc#rsa-1_5'/>
              <CipherData>
                  <CipherValue>naOnSSOnSPMaWWls......</CipherValue>
              </CipherData>
          </EncryptedKey>
        </Security>
  </s:Header>
  <s:Body>
        <MaintenanceRequest>──701
              <UserID>──702
                  <EncryptedData>
                      <EncryptionMethod Algorithm='http://www.w3.org
                          /2001/04/xmlenc#3DES-cbc'/>
                          <CipherData>
                              <CipherValue>NNMssObOncSOnSONNC
                                  ......</CipherValue>
                          </CipherData>
                  </EncryptedData>
              </UserID>
              <DeviceName>ABCD Printer</DeviceName>──703
              <CounterValue>──704
                      <A4>123456</A4>
                      <A3>4321</A3>
              </CounterValue>
              <TonersStatus>──705
                          .
                          .
                          .
              </TonerStatus>
              <ErrorLog>──706
                          <ErrorStatus>──707
                              .
                              .
                              .
                          </ErrorStatus>
              </ErrorLog>
        </MaintenanceRequest>
  </s:Body>
</s:Envelope>
```

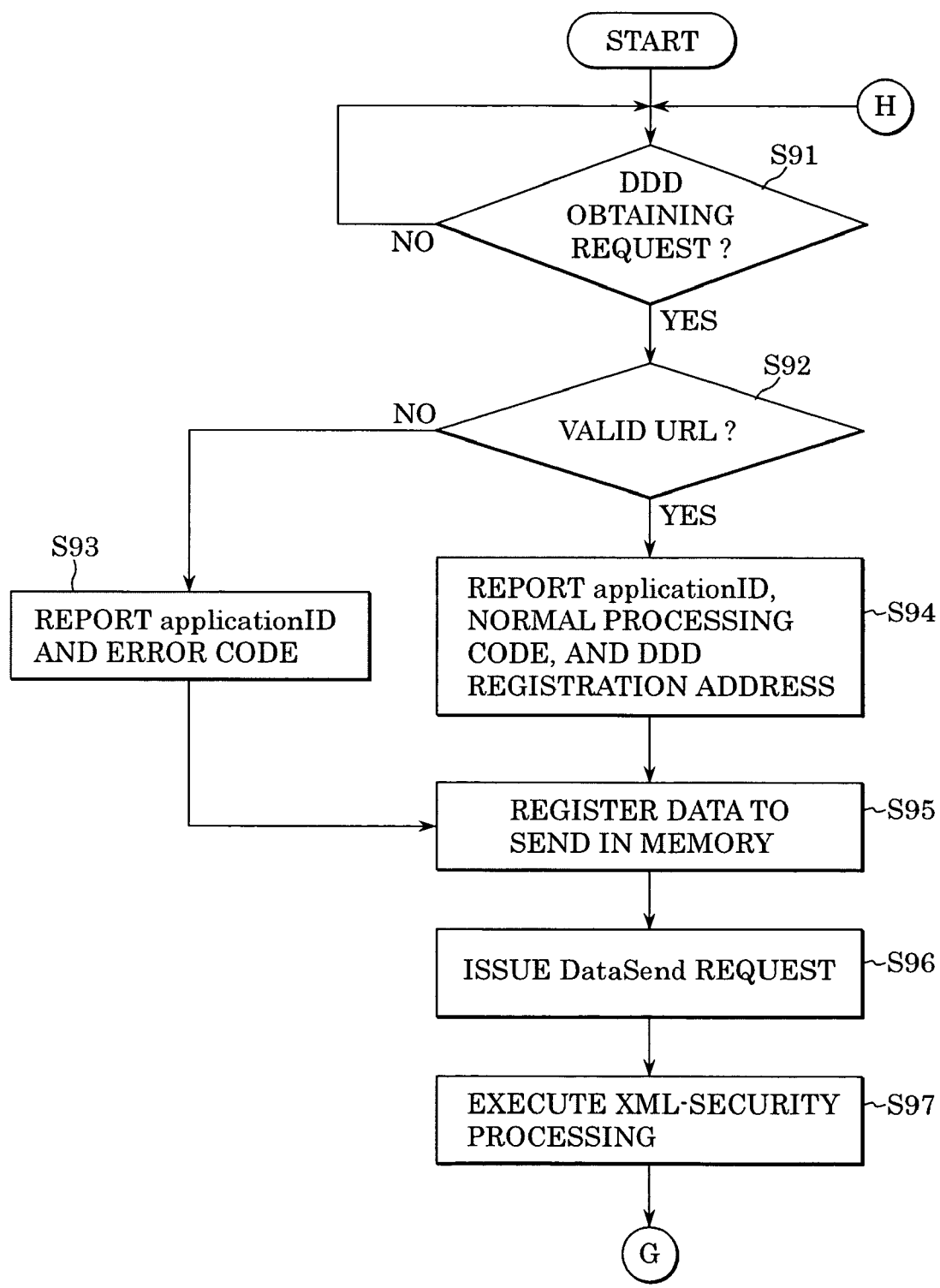

FIG. 12

```xml
<?xml version="1.0"?>
<root xmlns="urn:schemas-upnp-org:device-1-0">
 <specVersion>
   <major>1</major>
   <minor>0</minor>
 </specVersion>
 <URLBase>base URL for all relative URLs</URLBase>
 <device>
   <deviceType>urn:schemas-upnp-org:device:deviceType:v</deviceType>
   <friendlyName>short user-friendly title</friendlyName>
   <manufacturer>manufacturer name</manufacturer>
   <manufacturerURL>URL to manufacturer site</manufacturerURL>
   <modelDescription>long user-friendley title</modelDescription>
   <modelName>modelName</modelName>
   <modelNumber>modelNumber</modelNumber>
   <modelURL>URL to model site</modelURL>
   <serialNumber>manufacturer's serial number</serialNmber>
   <UDN>uuid:UUID</UDN>
   <UPC>Universal Product Code</UPC>
     <serviceList>  ~1201
       <service>  ~1202
         <serviceType>urn:schemas-upnp-org:service:serviceType:v</serviceType>
         <serviceId>urn:upnp-org:serviceId:serviceID</serviceId>
         <SCPDURL>URL to service description</SCPDURL>
         <controlURL>URL for control</controlURL>
         <eventSubURL>URL for eventing</eventSubURL>
       </service>
     </serviceList>
       <presentationURL>URL for presentation</presentationURL>
 </device>
</root>
```

FIG. 15

```xml
<?xml version="1.0"?>
<root xmlns="urn:schemas-upnp-org:device-1-0">
 <specVersion>
   <major>1</major>
   <minor>0</minor>
 </specVersion>
 <URLBase>base URL for all relative URLs</URLBase>
 <device>
    .
    .
    .
   <UDN>uuid:UUID</UDN>
   <UPC>Universal Product Code</UPC>
     <serviceList>~1201
     <EncryptionData ID='ED'>~1501
           <EncryptionMethod Algorithm='http://www.w3.org/2001/04/
           xmlenc#3DES-cbc'/>~1502
           <EncryptedKey ID='EK'>~1503
                 1504~<EncryptionMethod Algorithm='http://www.w3org/
                       2001/04/xmlenc#rsa-1_5'/>
                       <ReferenceList>~1505
                             <DataReference URI='#ED'/>
                       </ReferenceList>
                       <KeyInfo>~1506
                             <KeyName>MMMNNNN</Keyname>
                       </KeyInfo>
                       <CipherData>~1507
                             <CipherValue>adccmmyke</CipherValue>
                       </CipherData>
           </EncryptedKey>
           <KeyInfo>~1508
                 <EncKeyReference URI='#EK'/>
           </KeyInfo>
           <CipherData>~1509
              <CipherValue>DManaOBsiCCazWjsoSoDDDNccSIIpeW</
              CipherValue>
           </CipherData>
     </EncryptedData>
       <presentationURL>URL for presentation</presentationURL>
     </serviceList>
 </device>
</root>
```

FIG. 16

```
<wsdl:messege name="GetPrinterStatus">
    <wsd:part name="PrinterID" type="xsd:string" security="yes"/>
    <wsdl:part name="JobID" type="xsd:string" security="no"/>
    <ApplicationID>applicationName</ApplicationID>
1601 <EncryptedData>~1602
        <KeyInfo>~1604      1605
            <SymmentricKeyInfo> 1606
                <EncryptionMethod>3DES-CBC</EncryptionMethod>
                <KeyValue>~1607
                    AkBuaoKKahseJJkA......
                </KeyValue>
            </SymmetricKeyInfo>
            <PublicKeyInfo>~1608  1609
                <EncryptionMethod>RSA-PKCSv1.5</EncryptionMethod>
                <RetrievalMethod>~1610
                    URI to indicate the location of keyto
                </RetrievalMethod>
        1611~<KeyValue>AyNNMoHyase......</KeyValue>
            </PublicKeyInfo>
            <CipherData>~1612
                <CipherValue>ToMoSSmakJSbKMMoS...</CipherValue>
            </CipherData>
        </KeyInfo>
    </EncryptedData>
</wsdl:message>
```

INFORMATION PROCESSING APPARATUS, INFORMATION PROCESSING METHOD, AND PROGRAM THEREFOR

BACKGROUND OF THE INVENTION

1. Field of the Invention

The present invention relates to peripheral devices that support networking, information processing apparatuses that control the peripheral devices, information processing methods, and programs therefor.

2. Description of the Related Art

With the recent development of Web services, Extensible Markup Language (XML) is used in an increasing variety of applications such as business document management, messaging, and database. In accordance with the trend, XML-based security standards for Web services are being developed. For example, specifications relating to XML security, such as XML Digital Signature, XML Encryption, and WS-Security are being developed by standardization organizations such as the World Wide Web Consortium (W3C) and Organization for the Advancement of Structured Information Standards (OASIS).

As an example of XML-based Web services, in the case of UPnP®, which is being developed under the auspices of Microsoft® Corporation, a device description document in which information of a device that provides a service is written in XML is sent to a client that requests the service. The document includes information of a destination of a job request for controlling the service, written in the form of a uniform resource locator (URL).

When the service is used in an environment where a malicious third party is unlikely to get in, such as a home local area network (LAN) or a small office LAN, the need for hiding the destination of the job request is low. However, when a large number of general users can use the service via the Internet, if the destination of the job request is written in XML in a readable form, an unauthorized job could be placed by a malicious third party, possibly causing damage to the system that provides the service. Thus, in such an environment, security measure is to be taken on information written in the device description document.

For example, in a system for distributing moving-picture data over the Internet, techniques for a data encryption device that allows encrypting only a part of moving-picture data distributed so that only the part of data has to be decrypted, thus reducing cost of security processing, have been disclosed (refer to Japanese Patent Laid-Open No. 07-87077). The present invention has been made in view of the problems described below, not just simply for encrypting a part of a data stream.

When taking security measure for a service such as distribution of moving-picture data, common encryption algorithms, protocols, and the like must be used by a provider and a user of the service. Furthermore, a security system in accordance with a system configuration for using the service must be implemented.

That is, when XML-based Web services are provided, even if the services use the same functions, different methods of XML digital signature and XML encryption are needed in accordance with environments, security levels, and system configurations for using the services. That is, a security processing program must be developed for each software application that provides a service. This increases development cost, inhibits introduction of an optimal security system at an optimal timing, and causes damage through unauthorized access.

SUMMARY OF THE INVENTION

In view of at least one of the situations described above, the present invention provides an information processing apparatus, an information processing method, and a program therefore that allows network services with difference security levels to be readily implemented using a structured language.

According to an aspect of the present invention, an information processing apparatus is provided. The information processing apparatus includes a storage unit configured to store security processing information describing a security processing procedure that is to be applied to data handled by a service providing program and including data written in a structured language; and a security processing unit configured to execute security processing to encrypt or give a digital signature to the data handled by the service providing program, with reference to the security processing information stored in the storage unit, so that the service providing program can communicate securely with an external service providing program.

According to another aspect of the present invention, an information processing method that is executed using an information processing apparatus with a service providing program is provided. The information processing method includes a security processing step of executing security processing to encrypt or sign data handled by the service providing program and including data written in a structured language, with reference to security processing information describing a security processing procedure associated with the data, so that the service providing program is allowed to communicate securely with an external service providing program.

According to another aspect of the present invention, a program that allows a computer to execute the information processing method is provided.

With the information processing apparatus, information processing method, and program according to these aspects of the present invention, using information describing a security processing procedure, security processing is executed on a part or the entirety of data written in a structured language. Thus, for example, network services with different security levels can be readily implemented. Furthermore, development costs relating to security processing can be reduced considerably, and an optimal security system can be introduced at an optimal timing.

Further features and advantages of the present invention will become apparent from the following description of exemplary embodiments with reference to the attached drawings.

BRIEF DESCRIPTION OF THE DRAWINGS

FIG. 4 is a diagram showing an example format of an XML script.

FIG. 7 is a diagram showing an example format for sending maintenance information.

FIG. 10 is a diagram showing the result of modifying XML data in an example where mode="CONTENTS" and a <UserID> element is designated in an XML script.

FIG. 11 is a flowchart of a procedure for processing device information written in XML, executed by an application processor.

FIG. 12 is a diagram showing an example of a device description file stored in a memory of the printer.

FIG. 15 is a diagram showing the result of modifying XML data in an example where mode="ELEMENT" and a <service> element is designated in an XML script.

FIG. 16 is a diagram showing an example description of a WSDL message element.

DESCRIPTION OF THE EMBODIMENTS

Now, embodiments of the present invention will be described in detail with reference to the attached drawings.

Figure 18:
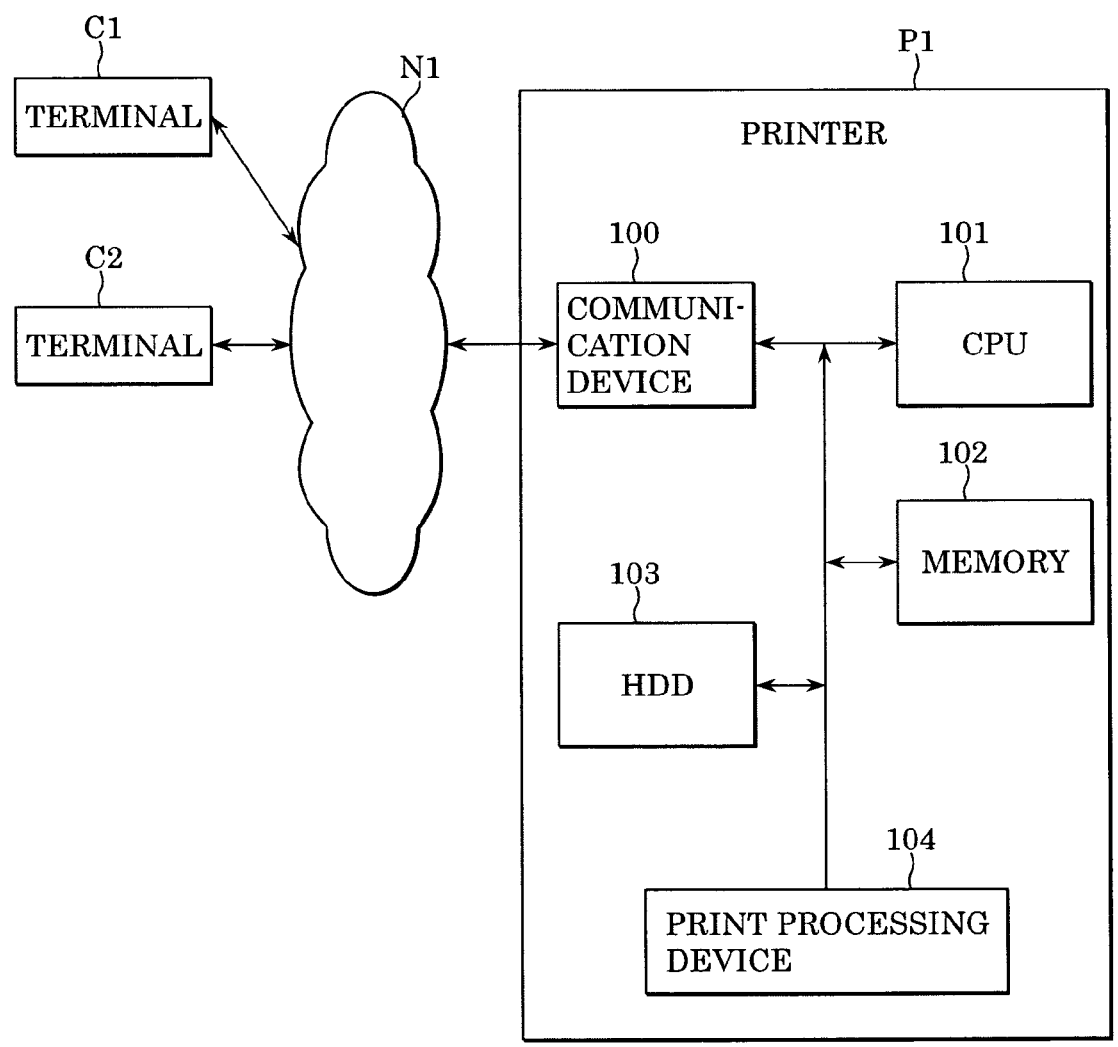
FIG. 18 is a diagram showing a configuration of a network printing system including a network-enabled printer according to an embodiment of the present invention.

First, a configuration of a network printing system including a network-enabled printer according to an embodiment of the present invention will be described. FIG. 18 is a diagram showing a configuration of a network printing system including a network-enabled printer according to an embodiment of the present invention. Referring to FIG. 18, a network-enabled printer P1 provides printing services to computer terminals that can be connected via a network N1. Computer terminals C1, C2 . . . use the printer P1 via the network N1. The printer P1 in this embodiment has a function of executing security processing on print data, profile information, status information or the like using the Extensible Markup Language (XML), which is a structured language.

The hardware configuration of the printer P1 includes, for example, a communication device 100, a central processing unit (CPU) 101, a memory 102, a hard disk drive (HDD) 103, a print processing device 104, and so forth. The communication device 100 carries out communications via the network N1. The CPU 101 is a computer that executes programs for performing various functions of the printer P1. More specifically, the CPU 101 reads service providing programs (application programs or the like) for executing various functions from the HDD 103, and executes the programs using the memory 102 as a work area.

The functional configuration of the printer P1 in this embodiment is described next.

Figure 1:
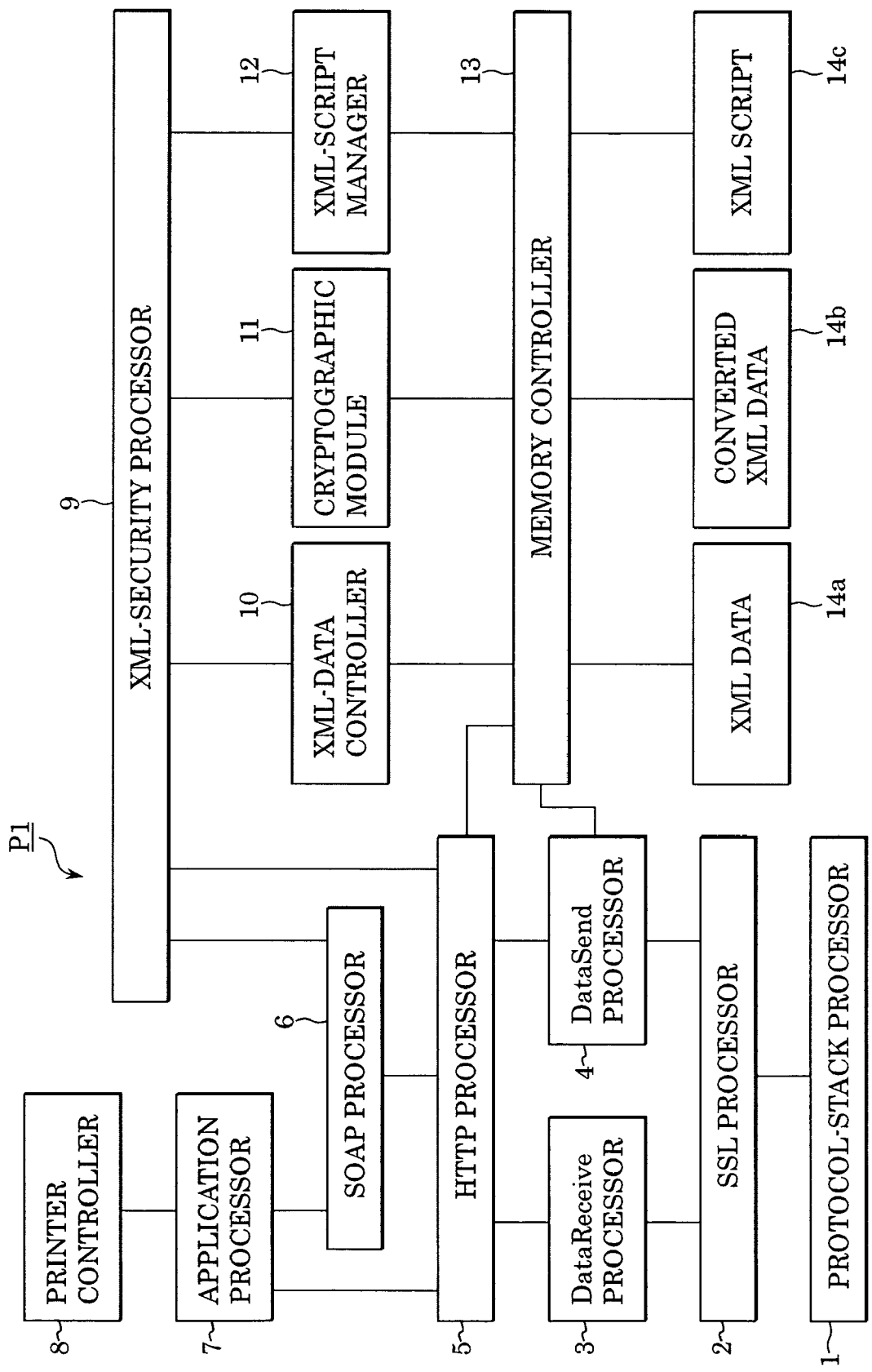
FIG. 1 is a block diagram showing the functional configuration of a printer according to an embodiment of the present invention.

FIG. 1 is a functional block diagram showing the functional configuration of the printer P1 in this embodiment. The printer P1 includes an application processor 7 that allows processing based on XML and the Simple Object Access Protocol (SOAP), and an XML-security processor 9. The application processor 7 and the XML-security processor 9 are implemented independently of each other by the respective functional modules shown in FIG. 1.

First, the configuration of functional modules that constitute lower layers of the application processor 7 will be described.

The printer P1 includes a protocol-stack processor 1 stacking TCP/IP/UDP (Transmission Control Protocol/Internet Protocol/User Datagram Protocol) protocols as communication functions. In an upper layer of the protocol-stack processor 1, the printer P1 includes a Secure Socket Layer (SSL)-processor 2 to ensure security on communication lines. Furthermore, the printer P1 includes a DataReceive processor 3 for receiving data and a DataSend processor 4 for sending data. In an upper layer of the DataReceive processor 3 and the DataSend processor 4, the printer P1 includes a Hypertext Transfer Protocol (HTTP) processor 5 that carries out communications based on HTTP 1.1. Furthermore, the printer P1 includes a SOAP processor 6 in an upper layer of the HTTP processor 5, and the application processor 7 in an upper layer of the SOAP processor 6.

The SOAP processor 6 creates a SOAP envelope corresponding to a function name of a processing module used by the application processor 7 and arguments for the processing module, and writes the SOAP envelope on a memory via a memory controller 13 in the form of XML data. Furthermore, the SOAP processor 6 parses a SOAP response received and generates a return value for the relevant processing module, maps it to an internal processing module, and calls the internal processing module. The application processor 7 is implemented on an uppermost layer to allow processing of various network applications by the network-enabled printer. The application processor 7 can support a plurality of applications, including some applications that are capable of communicating with a printer controller 8 that controls the print processing device 104 shown in FIG. 18.

The configurations of functional modules that constitute lower layers of the XML-security processor 9 are described next. The functional modules in the lower layers of the XML-encryption processor 9 are capable of accessing memories via the memory controller 13. The memory controller 13 controls writing data to or reading data from a memory 14a that stores XML data, a memory 14b that stores encrypted XML data, and a memory 14c that stores an XML script describing an encryption procedure.

Without limitation to the memories 14a to 14c, for example, the memory controller 13 may control access to other memories, e.g., a memory (not shown) that stores information needed to use the printer P1 via the network N1 (e.g., account information or device description file). Regarding the hardware configuration of the memories, the memories 14a to 14c and other memories may be implemented by a common recording medium or by separate recording media.

As shown in FIG. 1, the XML-encryption processor 9 includes an XML-data processor 10, a cryptographic module 11, and an XML-script manager 12 in layers. The XML-data processor 10 allows processing based on the XML Path Language (XPath), the Extensible Stylesheet Language Transformations (XSLT), and the Document Object Model (DOM). The cryptographic module controls processing based on encryption algorithms, such as 3DES-CBC, AES128-CBC, AES256-CBC, RSA-PLCS v1.5, RSA-OAEPCMS, 3DES Key Wrap, AES Key Wrap, SHA-1, SHA256 and SHA512.

The XML-encryption processor 9 with the lower layers described above reads an XML script registered on the memory 14c via the memory controller 13, encrypts XML data recorded on the memory 14a according to the content of the XML script, and records the encrypted XML data on the memory 14b via the memory controller 13. The XML-script manager 12 executes registration, deletion, and authentication of XML scripts. The XML-encryption processor 9 is capable of communicating with external network-enabled information processing apparatuses via the SOAP processor 6.

The application processor 7 transfers control to the XML-encryption processor 9 after registering XML data on the memory 14a via the memory controller 13. Then, the XML-encryption processor 9 encrypts XML data registered on the memory 14a according to a procedure described in an XML script stored in the memory 14c, and edits the XML data according to the result. At that time, the XML-encryption processor 9 determines whether the original XML data is written in the form of a SOAP envelope. When it is determined that the XML data is written in the form of a SOAP envelope, the XML-encryption processor 9 edits the encrypted information according to the format defined by the OASIS WS-Security. On the other hand, when it is determined that the original XML data is not written in the form of a SOAP envelope, the XML-encryption processor 9 edits the encrypted information (XML data) according to the format defined by the W3C XML Encryption, and registers the result on the memory 14b via the memory controller 13.

The application processor 7 executes a process for sending the encrypted and edited XML data when a notification of completion of processing by the XML-encryption processor 9 is received.

In this embodiment, an XML script describing an encryption procedure associated with an application that is executed on the printer P1 is registered in advance in the printer P1. When the XML script associated with the application is not registered and is absent on the memory 14c of the printer P1, encryption is not executed. The XML script is stored in the memory 14c by an administrator of a network system including the printer P1 by registering the XML script via a network.

The XML-script manager 12 allows ID registration, alteration of registration, and deletion of registration by the system administrator. These operations are carried out from an external device operated by the system administrator (e.g., the computer terminal C1 shown in FIG. 18) based on XML-SOAP, communicating with a computer having recorded the XML script thereon.

In this embodiment, only one administrator is allowed to register an XML script for each application. In this case, the following XML-SOAP RPCs (Remote Procedure Calls) are provided for registration of an account of an administrator.

RegistrationID (applicationID, account, password) is a SOAP function for opening an account, where:
   applicationID is an ID for uniquely associating an XML script with an application, and is represented by a text string of up to 32 characters;
   account is the name of an account of an administrator, and is represented by a text string of up to 16 characters; and
   password is a password for the account, and is represented by a text string of up to 16 characters. These parameters (applicationID, account and password) are used to uniquely identify the account and are used for performing various functions with respect to the account (as shown below).
ChangePassword (applicationID, account, password, newPassword) is a SOAP function for changing a password of a designated account, where:
   applicationID, account, and password are the values that were set when the account was opened using RegistrationID; and
   newPassword is the new password set for the account.
DeleteID (applicationID, account, password) is a SOAP function for deleting a registered account, where:
   applicationID, account, and password are the values of the account to be deleted that were set when the account was opened using RegistrationID. When the password has been changed using ChangePassword, the current password is used.

Figure 2:
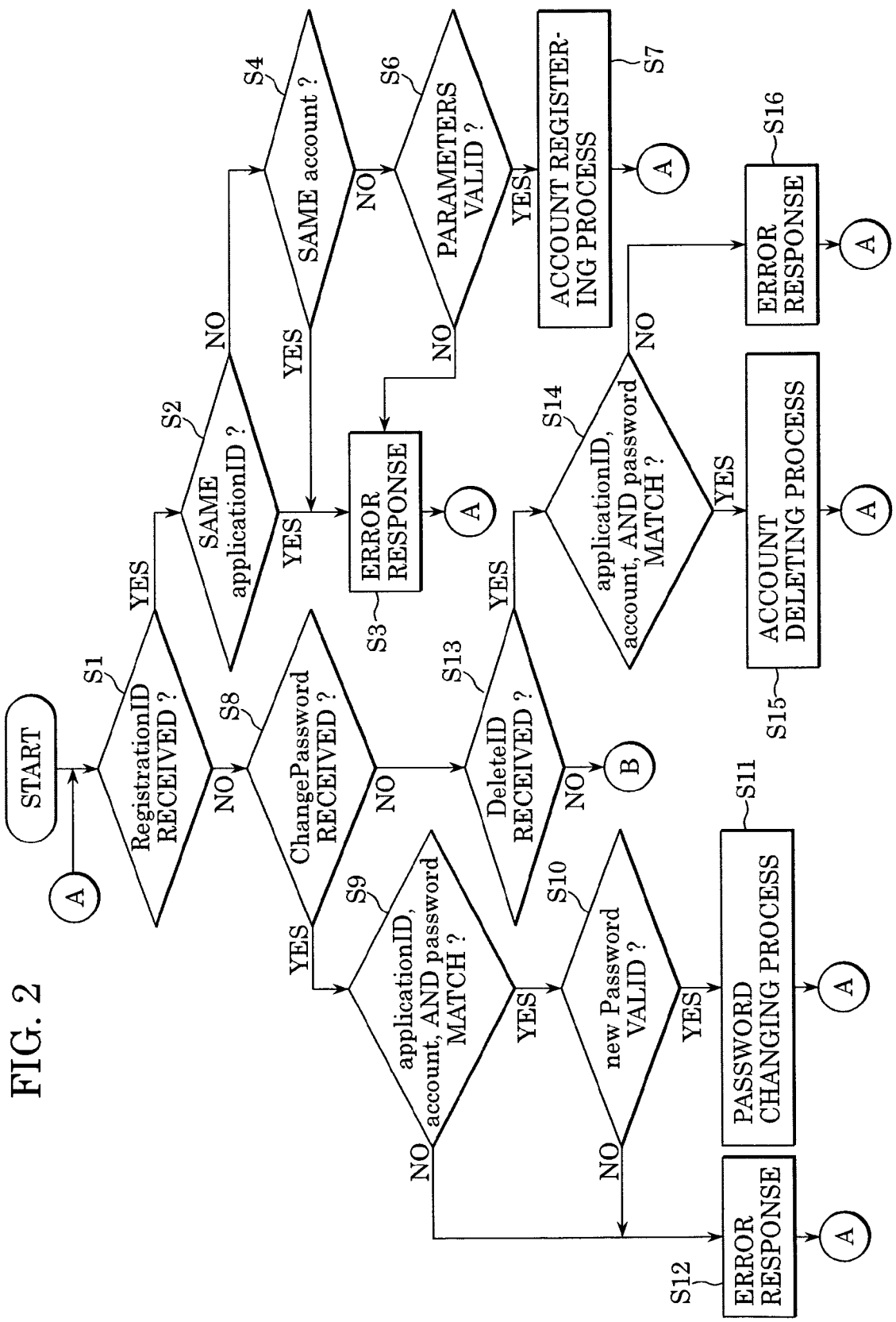
FIG. 2 is a flowchart showing a procedure for registering an account.

Operation of the network printing system in this embodiment is described in detail next with reference to flowcharts. FIG. 2 is a flowchart of an account registration procedure.

In the procedure shown in FIG. 2, it is presupposed that an external device that is a computer managed by a system administrator and having recorded thereon an XML script (e.g., the computer terminal C1 shown in FIG. 18) uses an HTTP POST request, and sends a SOAP request for the account registration procedure as an entity body of the request to the printer P1 including the XML-encryption processor 9. Since the request is sent using SSL, the security of packets exchanged is ensured by SSL.

The XML-script manager 12 of the XML-encryption processor 9 receives the SOAP request RegistrationID via the SOAP processor 6 (yes in step S1). Then, the XML-script manager 12 determines whether an account already exits for the same applicationID (step S2). When an account has already been registered for the applicationID specified by the SOAP request (yes in step S2), since only one administrator account can be registered for each application in this embodiment, an error response message is returned via the SOAP processor 6 (step S3). In this case, an account can be opened for the same applicationID only after the administrator deletes the registered account using DeleteID request. Processing then returns to step S1.

When the same applicationID does not exist (no in step S2), the procedure proceeds to step S4, in which the XML-script manager 12 determines whether the same account already exists. When the account specified by the SOAP request has already been registered (yes in step S4), the procedure proceeds to step S3. In step S3, since only one administrator account can be registered for each application in this embodiment, the XML-script manager 12 returns an error response message via the SOAP processor 6. In this case, an account for the same applicationID cannot be opened unless the administrator deletes the registered account using DeleteID request. Processing then returns to step S1.

On the other hand, when the same account does not exist (no in step S4), the XML-script manager 12 determines whether the values of the parameters of the RegistrationID request are valid (step S6). When it is determined that the values of the parameters are valid (yes in step S6), the XML-script manager 12 registers an account (step S7). More specifically, the XML-script manager 12 records the account information in a memory via the memory controller 13. Processing then returns to step S1. When it is determined that the parameter values are not all valid (no in step S6), the procedure proceeds to step S3, in which the XML-script manager 12 sends an error response message via the SOAP processor 6. Processing then returns to step S1.

When RegistrationID has not been received in step S1, the XML-script manager 12 of the XML-encryption processor 9 determines whether the SOAP request ChangePassword has been received via the SOAP processor 6 (step S8). When the SOAP request ChangePassword has been received via the SOAP processor 6 (yes in step S8), the XML-script manager 12 compares the parameters applicationID, account, and password of the request with the account information registered on the memory (step S9). When all these parameter values match (yes in step S9), the XML-script manager 12 determines whether the value of newPassword is valid (step S10). When it is determined that the value is valid (yes in step S10), the XML-script manager 12 changes the password information of the relevant account, and records the changed password information on the memory via the memory controller 13 (step S11). Processing then returns to step S1.

When any of the parameter values does not match the information recorded on the memory (no in step S9), or when the value of newPassword is invalid (no in step S10), the XML-script manager 12 sends an error response message via the SOAP processor 6 (step S12). Processing then returns to step S1.

When ChangePassword is not received in step S8, the XML-script manager 12 of the XML-encryption processor 9 determines whether the SOAP request DeleteID has been received via the SOAP processor 6 (step S13). When it is determined that the SOAP request DeleteID has been received via the SOAP processor 6 (yes in step S13), the XML-script manager 12 compares the parameters applicationID, account, and password of the request with the account information registered on the memory via the memory controller 13 (step S14). When all of these parameter values match (yes in step S14), the XML-script manager 12 deletes the account information recorded on the memory via the memory controller 13 (step S15). Processing then returns to step S1. On the other hand, when any of the parameters do not match the information recorded on the memory (no in step S14), the XML-script manager 12 sends an error response message via the SOAP processor 6 (step S16). Processing then returns to step S1.

By the procedure described above with reference to FIG. 2, the system administrator is allowed to register an account, change a password, or delete an account by sending a SOAP request from the computer terminal C1 to the printer P1. When it is determined in step S13 that the SOAP request DeleteID has not been received via the SOAP processor 6 (no in step S13), the XML-encryption processor 9 enters step S21 shown in FIG. 3.

Then, the system administrator with a registered account sends an XML script including an encryption procedure associated with an application (the application processor 7) supported by the printer P1 from the computer terminal C1 to the printer P1. For example, the printer P1 communicates, based on XML-SOAP, with an external device managed by the system administrator and having recorded the XML script thereon (e.g., the computer terminal C1). In this embodiment, the following XML-SOAP RPCs (Remote Procedure Calls) are provided for registration and deletion of XML scripts. This allows the XML-script manager 12 to register or delete XML scripts.

UploadScript (applicationID, account, password) is a SOAP function for sending and registering an XML script to the printer P1. The same applicationID, account, and password that are used when the account is opened using RegistrationID are used. When the password has been changed using ChangePassword, the current password is used. The XML script, which is XML data, is sent in the form of an attached file of a SOAP envelope describing the SOAP function.

DeleteScript (applicationID, account, password) is a SOAP function for deleting an XML script registered in the printer P1. The same applicationID, account, and password that are used when the account is opened using RegistrationID are used. When the password has been changed using ChangePassword, the current password is used.

In this embodiment, communications between the printer P1 and an external device on which an XML script can be registered are encrypted on communications-link level based on SSL2, and the XML script itself is encrypted using a predetermined algorithm. Thus, the security of communications between the printer P1 and the external device is enhanced.

Next, a procedure for registering an XML script is described with reference to drawings.

Figure 3:
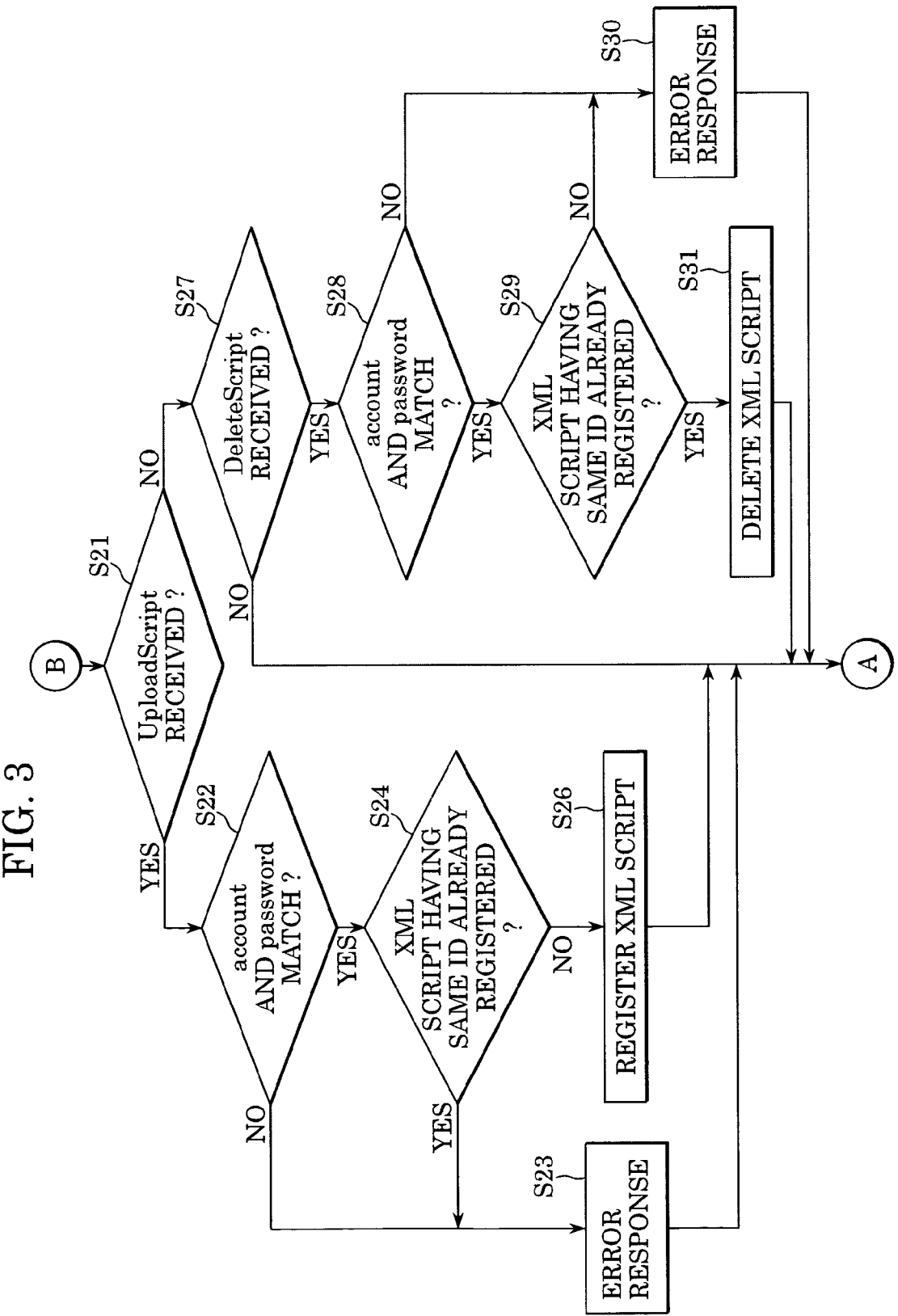
FIG. 3 is a flowchart showing a procedure for registering an XML script in the printer according to the embodiment.

FIG. 3 is a flowchart showing the procedure for registering an XML script in the printer P1 in this embodiment.

In the procedure shown in FIG. 3, it is presupposed that the computer terminal C1 as an external device uses a HTTP POST request and sends a SOAP request and an XML script as an entity body of the request to the printer P1 including the XML-encryption processor 9. At this time, SSL is used for sending the request, so that the security of packets exchanged is ensured.

As shown in FIG. 3, first, the XML-script manager 12 of the XML-encryption processor 9 determines whether the SOAP request UploadScript has been received via the SOAP processor 6 (step S21). When it is determined that the SOAP request UploadScript has been received (yes in step S21), the XML-script manager 12 determines whether the arguments account and password match the information recorded in the memory (hereinafter referred to as account information) via the memory controller 13 (step S22).

When it is determined in step S22 that the account information does not match (no in step S22), the XML-script manager 12 returns an error response message via the SOAP processor 6 (step S23). Processing then returns to step S1 (FIG. 2). On the other hand, when it is determined in step S22 that the account information matches (yes in step S22), the XML-script manager 12 determines whether an XML script associated with the same applicationID has already been registered (step S24).

When it is determined in step S24 that an XML script has already been registered (yes in step S24), since only one file of XML script can be registered for each application in this embodiment, the procedure proceeds to step S23, in which the XML-script manager 12 returns an error response message via the SOAP processor 6. The procedure then returns to step S1 shown in FIG. 2. In this case, an XML script cannot be registered for the same applicationID unless the administrator deletes the registered XML script.

When it is determined in step S24 that an XML script has not been registered (no in step S24), the XML-script manager 12 records the XML script transmitted in the form of an attached file of the request on the memory 14c via the memory controller 13 (step S26). By the procedure described above, the XML-script manager 12 registers an XML script defining an encryption procedure associated with an application in the memory 14c. Processing then returns to step S1 (FIG. 2).

When it is determined in step S21 that the SOAP request UploadScript has not been received (no in step S21), the XML-script manager 12 determines whether the SOAP request DeleteScript has been received via the SOAP processor 6 (step S27). When it is determined that the SOAP request DeleteScript has been received (yes in step S27), the XML-script manager 12 determines whether the arguments account and password match the account information recorded on the memory via the memory controller 13 (step S28).

When it is determined in step S28 that the account information does not match (no in step S28), the XML-script manager 12 returns an error response message via the SOAP processor 6 (step S30). Processing then returns to step S1 (FIG. 2). On the other hand, when it is determined that the account information matches (yes in step S28), the XML-script manager 12 determines whether an XML script associated with the same applicationID has already been registered (step S29).

When it is determined that an XML script having the specified applicationID is not recorded (not registered) on the memory 14c, the XML-script manager 12 returns an error response message via the SOAP processor 6 (step S30). Processing then returns to step S1 (FIG. 2). On the other hand, when an XML script having the specified applicationID is recorded (registered) on the memory, the XML-script manager 12 deletes the XML script recorded on the memory via the memory controller 13 (step S31). Processing then returns to step S1 (FIG. 2).

By the procedure described above, an XML script associated with an application is registered from the external device (computer terminal C1) to the printer P1. The system administrator is allowed to repeatedly register or delete XML scripts of applications as needed.

When the procedure for registering an XML script is completed, the XML-encryption processor 9 executes pre-processing as needed according to the content of the XML script.

FIG. 4 shows an example format of an XML script.

As shown in FIG. 4, an XML script is written in XML, starting with an XML declaration. In this embodiment, one XML script can be registered for each application. In the XML script, a plurality of elements is defined. The XML script is written in a structured manner with elements each defined by a set of tags, e.g., <A> and </A>, enclosing various information, the elements being arranged in a tree structure.

Referring to FIG. 4, an element 401 defined by <ApplicationID> tag is used as an ID for uniquely identifying an application for executing XML encryption. The content thereof is information defined by a text string of up to 32 characters. An element 402 defined by <EncryptedData> tag includes XML-encrypted content. In FIG. 4, as child elements of the element 402, an element 403 defined by <EncryptionTarget mode> tag and an element 404 defined by <KeyInfo> tag are defined. Hereinafter, an element defined by <xx> tag will be simply referred to as an <XX> element.

The <EncryptionTarget mode> element 403 is used to specify a mode for carrying out XML encryption. More specifically, three modes "ALL", "ELEMENT", and "CONTENTS" can be specified. When the mode is "ALL", the entire XML document used by an application is encrypted. When the mode is "ELEMENT", the element written as content of the <EncryptionTarget mode> element ("element name" in FIG. 4) and its child elements are encrypted. When the mode is "CONTENTS", the content of the element written as content of the <EncryptionTarget mode> element and the contents of its child elements are encrypted.

The <KeyInfo> element 404 defines information regarding a symmetric key and a public key that are used for encryption. Referring to FIG. 4, a <SymmetricKeyInfo> element 405 defines information regarding the symmetric key, and an <EncryptionMethod> element 406, which is a child element of the <SymmetricKeyInfo> element 405, defines an algorithm used for encryption. In this embodiment, one of 3DES-CBC, AES128-CBC, and AES256-CBC is specified in the element 406, as shown in FIG. 4. The algorithm is specified by a text string representing one of these algorithms.

A <KeyValue> element 407 includes a value obtained by text conversion by Base64 encoding of the value of a symmetric key generated using the algorithm specified by the element 406.

A <PublicKeyInfo> element 408 defines information regarding a public key, and an element <EncryptionMethod> 409, which is a child element of the element 408, specifies an algorithm used for encryption. In this embodiment, one of RSA-PKCS v1.5 and RSA-OAEP is specified, as shown in FIG. 4. The algorithm is specified by a text string representing one of these algorithms.

A <RetrievalMethod> element 410 specifies a uniform resource identifier (URI) of a location for retrieving the public key.

A <KeyValue> element 411 includes a value obtained by text conversion by Base64 encoding of a public key obtained from a communicating party when the communicating party is a specified application. When the element 411 is not included in the XML script, or when the content thereof is blank, the XML-encryption processor 9 retrieves a public key when the application is executed.

A <CipherData> element 412 includes a value obtained by text conversion by Base64 encoding of a value obtained by encrypting the symmetric key defined by the <SymmetricKeyInfo> element 405 with the public key defined by the <PublicKeyInfo> element 408. When the <KeyValue> of the symmetric key or the public key is not written in the XML script, the content of the element 412 is blank.

In this embodiment, when the <EncryptionTarget mode> element 403 specifies the mode "ELEMENT" or "CONTENTS", it is possible to specify encryption of a plurality of elements. In that case, a number of the <EncryptedData> elements 402 shown in FIG. 4 corresponding to the number of elements to be encrypted is written.

Figure 5:
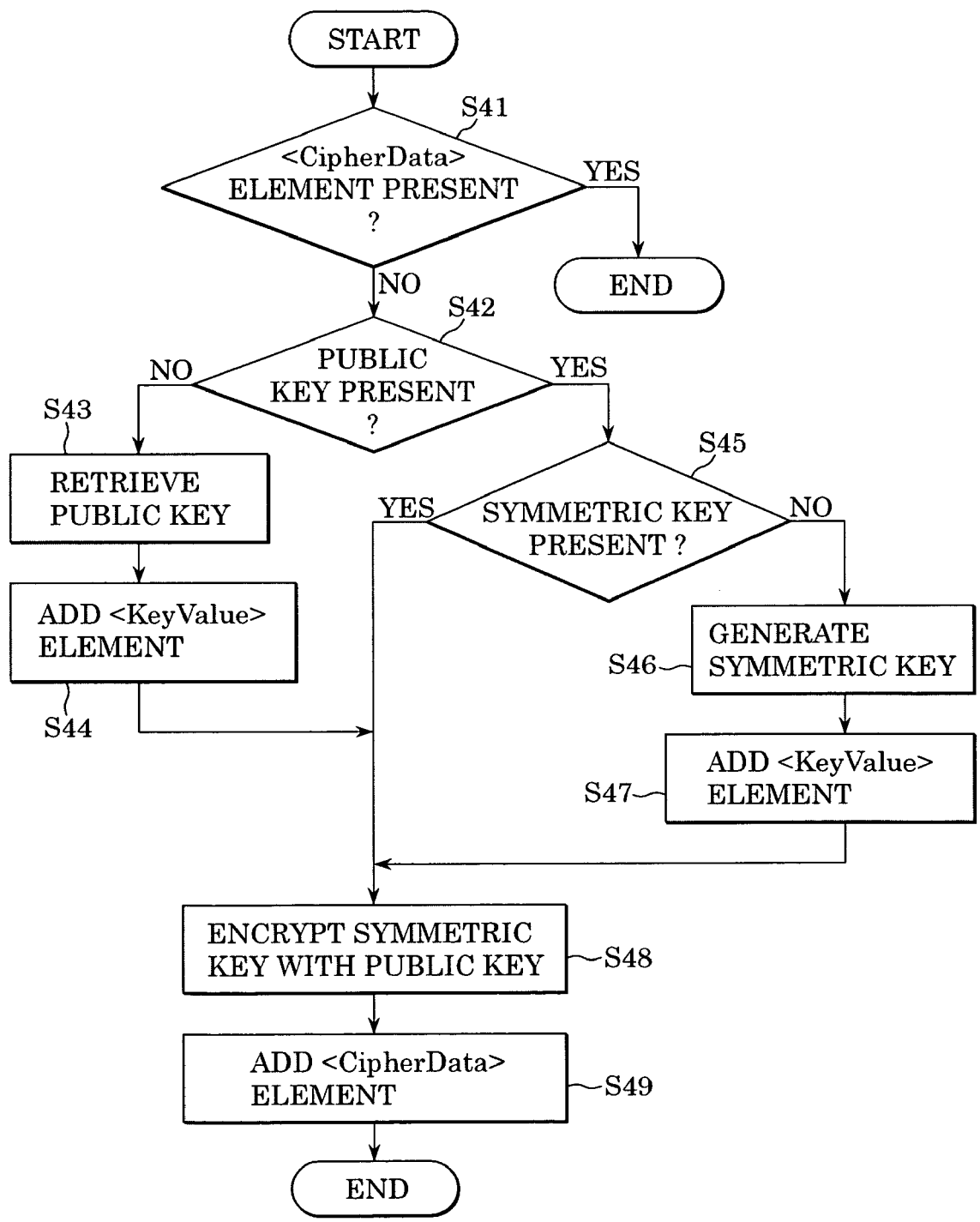
FIG. 5 is a flowchart showing a procedure that is executed by an XML-security processor to validate an XML script.

When the procedure for registering an XML script is completed in step S26 shown in FIG. 3, the XML-encryption processor 9 executes validation of the XML script. FIG. 5 is a flowchart of an XML-script validating procedure that is executed by the XML-encryption processor 9.

The XML-encryption processor 9 parses the XML script registered in the memory 14c via the memory controller 13 to check whether the content of the <CipherData> element (the element 412 shown in FIG. 4) is present in the XML script (step S41). When it is determined that the content of the <CipherData> element is present (yes in step S41), processing ends.

On the other hand, when it is determined that the content of the <CipherData> element is absent (no in step S41), the XML-encryption processor 9 parses the content of the <PublicKeyInfo> element (the element 408 in FIG. 4) to check whether a public key is present (step S42). More specifically, the XML-encryption processor 9 parses the <KeyValue> element (the element 411 in FIG. 4) including public-key information, which is a child element of the <PublicKeyInfo> element, to determine whether a public key is present.

When it is determined that the public key is absent (no in step S42), the XML-encryption processor 9 retrieves a public key from the URI specified by the <RetrievalMethod> element (the element 410 in FIG. 4) (step S43). Then, the XML-encryption processor 9 performs Base64 encoding on the key information retrieved in step S43, and adds the result as the content of a <KeyValue> element (step S44). The procedure then proceeds to step S48.

On the other hand, when it is determined in step S42 that a public key is present (yes in step S42), the XML-encryption processor 9 parses the content of the <SymmetricKeyInfo> element (the element 405 in FIG. 4) to determine whether a symmetric key is present (step S45). More specifically, the XML-encryption processor 9 parses the content of the <KeyValue> element (the element 407 in FIG. 4), which is a child element of the <SymmetricKeyInfo> element 405, to determine whether a symmetric key is present. When it is determined that a symmetric key is absent (no in step S45), the XML-encryption processor 9 generates a symmetric key based on the algorithm specified by the <EncryptionMethod> element (the element 406 in FIG. 4) (step S46), performs Base64 encoding on the key information generated, and adds the result as the content of the <KeyValue> element (the element 407 in FIG. 4) (step S47). The procedure then proceeds to step S48.

On the other hand, when it is determined that a symmetric key is present (yes in step S45), processing proceeds to step S48.

In step S48, the XML-encryption processor 9 encrypts the symmetric key based on the algorithm specified by the <EncryptionMethod> element (the element 409 in FIG. 4), which is a child element of the <PublicKeyInfo> element. Then, the XML-encryption processor 9 performs Base64 encoding on the result (i.e., the symmetric-key information encrypted with the public key), and adds the result to the XML script as a <CipherData> element (the element 412 in FIG. 4) (step S49). Processing then ends.

Security processing on XML data and SOAP packets generated and issued by the application processor 7 implemented on the printer P1 are described next. The description given is in the context of an example where the application processor 7 of the printer P1 executes processing for a maintenance-information management application.

The printer P1 in this embodiment includes the application processor 7 that is a maintenance-information management application. The application processor 7, at a predetermined interval, collects number-of-copies information for each output sheet size, status information of print toner, which is a consumable product, and error log information to generate maintenance information, and sends the maintenance information to a server system that manages maintenance information of each printer.

An example format that is used when the application processor 7 sends the maintenance information is described next.

FIG. 7 shows an example format that is used when the application processor 7 sends the maintenance information. In this embodiment, the following XML-SOAP RPCs (Remote Procedure Calls) are used.

A <MaintenanceRequest> element 701 is a SOAP function for reporting maintenance information, including child elements 702 to 706, namely, <UserID> 702, <DeviceName> 703, <CounterValue> 704, <TonerStatus> 705, and <ErrorLog> 706 elements. The <UserID> element 702 includes an ID (identification information) for uniquely identifying an owner, and is represented by a text string of up to 32 characters. The <DeviceName> element 703 includes a product name, and is represented by a text string of up to 256 characters.

The <CounterValue> element 704 includes counter information for each output sheet supported by the printer P1, describing information representing the number of sheets used. As child elements of the <CounterValue> element 704, counter values are written as contents of <A4> and <A3> elements representing the respective sheet sizes (A4 and A3) as shown in FIG. 7.

The <TonerStatus> element 705 describes the status of toner consumption of the printer P1. In this embodiment, the present invention is capable of color printing, so that FULL, MIDDLE, or LOW is described as the contents of child elements <Cyan>, <Magenta>, <Yellow>, and <Black> representing toners of the respective colors.

The <ErrorLog> element 706 includes log information of the error status of the printer P1, and as a child element thereof, an <ErrorStatus> element 707 for describing the details of an individual error is defined. As the content of the element 707, a <time> element for describing a time of occurrence of error and an <ErrorCode> element describing an error code are defined. When a plurality of pieces of error information exists, a plurality of <ErrorStatus> elements 707 are described as child elements of the <ErrorLog> element 706.

A procedure for generating the maintenance information shown in FIG. 7, executed by the application processor 7 is described next.

Figure 6:
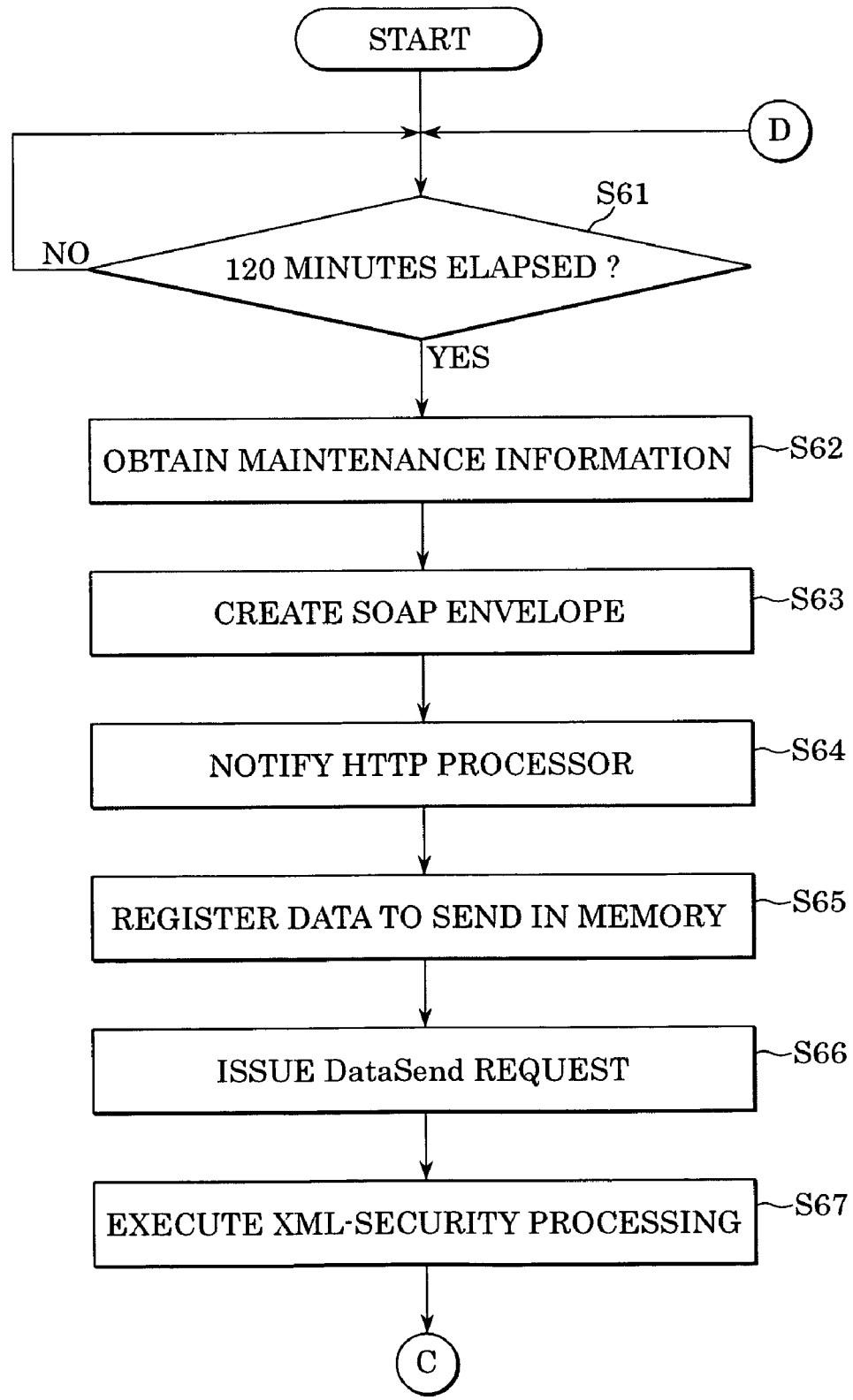
FIG. 6 is a flowchart showing a procedure relating to maintenance information in an application processor implemented on the printer.

FIG. 6 is a flowchart of the procedure for generating maintenance information, executed by the application processor 7 implemented on the printer P1.

Referring to FIG. 6, the application processor 7 determines whether a predetermined interval (120 minutes in this embodiment) has passed (step S61). When it is determined that 120 minutes has passed (yes in step S61), the application processor 7 communicates with the printer controller 8 to collect information corresponding to the arguments of the SOAP function defined by the <MaintenanceRequest> element shown in FIG. 7 (ID of the owner of the printer P1, the product name of the printer P1, information representing the number of sheets used, the status of toner consumption, and log information of error status) (step S62).

Then, the application processor 7 generates a SOAP envelope by the SOAP processor 6, and registers the SOAP envelope in the memory via the memory controller 13 (step S63). Then, the application processor 7 reports applicationID uniquely defining a maintenance application and a memory address where the SOAP envelope is registered to the HTTP processor 5 (step S64).

Thus, the HTTP processor 5 creates an HTTP response header in the memory via the memory controller 13, attaches the SOAP envelope created in step S63 as entity data thereof, and records it in the memory via the memory controller 13 (step S65). Then, the HTTP processor 5 issues a DataSend request for sending the data recorded in the memory (step S66). In this embodiment, applicationID and the address of the memory where the data to send is stored are written as arguments of the DataSend request. In this case, an address of the memory where the HTTP response header data and the SOAP envelope as the entity data thereof are recorded is set.

In response to the request, the DataSend processor 4 writes the argument applicationID and MiatenanceRequest data to a predetermined memory area via the memory controller 13. Upon completion of the writing, the memory controller 13 notifies the XML-encryption processor 9 of the completion of the writing (step S67). The procedure proceeds to step S68 in FIG. 8 described below.

A procedure that is executed subsequently to the procedure shown in FIG. 6 (and described above) is described next with reference to FIG. 8.

Figure 8:
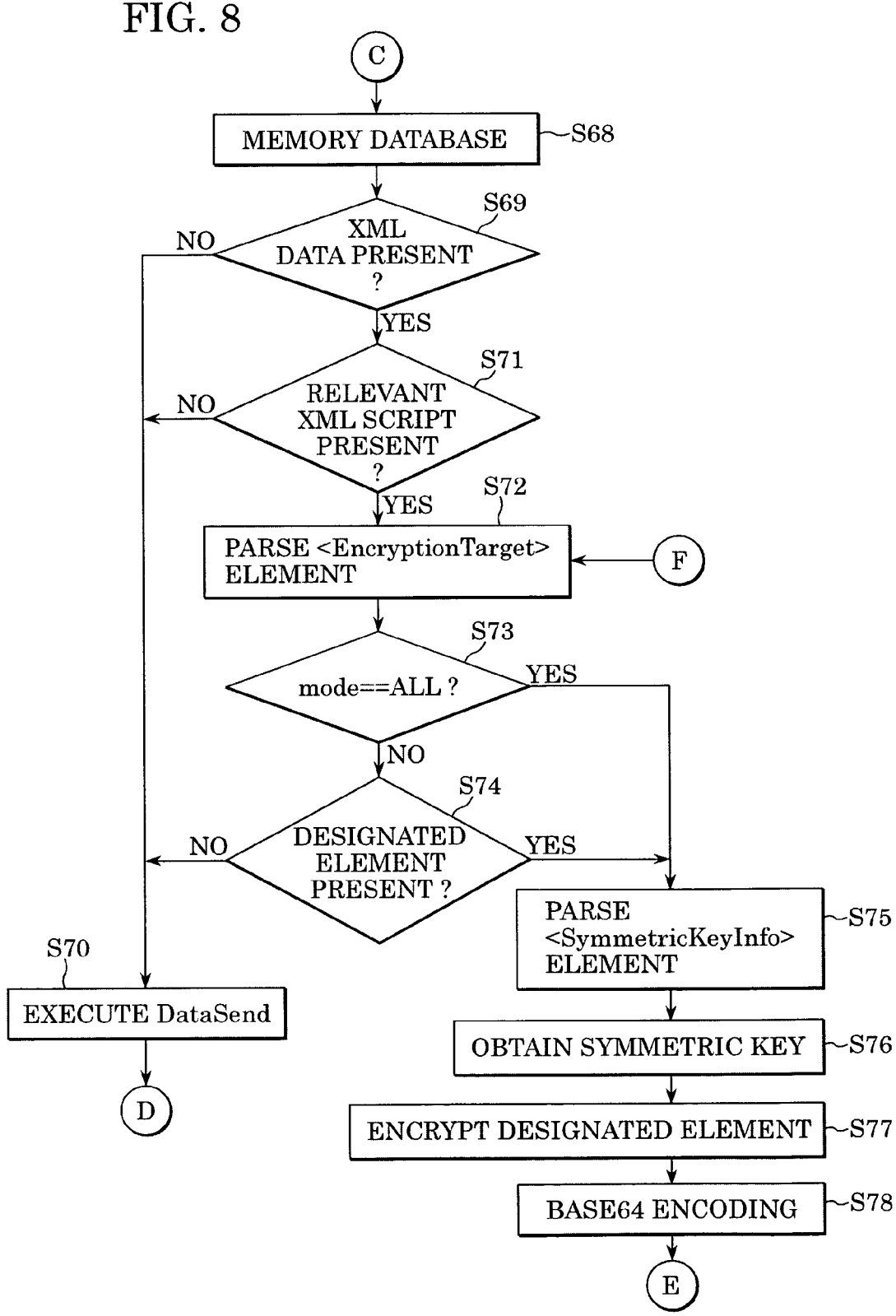
FIG. 8 is diagram showing a flow of security processing executed by the XML-security processor.

FIG. 8 shows the flow of a security procedure executed by the XML-encryption processor 9. Referring to FIG. 8, the XML-encryption processor 9 parses data at the memory address reported via the memory controller 13 (step S68). Then, the XML-encryption processor 9 determines whether XML data is present according to the parsing (step S69).

When it is determined that XML data is absent at the memory address reported (no in step S69), the DataSend processor 4 sends the data to send, stored in the memory, onto the network N1 via the protocol-stack processor 1 (step S70).

For example, it is determined that XML data is absent at the memory address reported when a SOAP envelope to be returned need not be encrypted. After step S70, the procedure returns to step S61 shown in FIG. 6.

On the other hand, when it is determined that XML data is present at the memory address reported in step S69 (yes in step S69), the XML-encryption processor 9 executes searching to determine whether an XML script having the applicationID specified in the memory 14c via the memory controller 13 has been registered (step S71).

When it is determined by the searching that an XML script having a matching applicationID is not recorded in the memory 14c (no in step S71), the XML-encryption processor 9 determines that encryption is not needed. Then, the processing is returned to the DataSend processor 4. Then, the procedure proceeds to step S70, in which the DataSend processor 4 sends the data stored on the memory onto the network N1 via the protocol-stack processor 1. For example, it is determined that an XML script is not recorded on the memory 14c when a SOAP envelope to be returned need not be encrypted. After step S70, the procedure returns to step S61 shown in FIG. 6.

On the other hand, when it is determined by the searching in step S71 that an XML script having matching applicationID is recorded (yes in step S71), the XML-encryption processor 9 parses the XML script to read an <EncryptionTarget> element (element 403 in FIG. 4) and the content thereof (step S72).

When it is determined by the parsing in step S72 that the mode is ELEMENT or CONTENT (no in step S73), the XML-encryption processor 9 reads an encryption target element included as the content of the element, and executes searching to determine whether the designated element is present in the SOAP envelope of the transmission data (step S74).

When it is determined by the searching that the designated element is not included in the SOAP envelope of the transmission data (no in step S74), the XML-encryption processor 9 determines that encryption is not needed. Then, the processing returns to the DataSend processor 4. Then, the procedure proceeds to step S70, in which sends the transmission data stored in the memory onto the network N1 via the protocol-stack processor 1. For example, it is determined that the designated element is not included in the SOAP envelope when a SOAP envelope to be returned need not be encrypted. After step S70, the procedure returns to step S61 shown in FIG. 6.

On the other hand, when it is determined in step 74 that the designated element is included in the SOAP envelope of the transmission data (yes in step S74), or when it is determined in step S73 that the mode specified by the <EncryptionTarget> element included in the XML script is ALL (yes in step S73), the XML-encryption processor 9 reads the <KeyInfo> element and the content thereof included in the XML script and starts encryption (step S75).

Then, the XML-encryption processor 9 parses the <KeyValue> element, which is a child element of the <SymmetricKeyInfo> element, performs Base64 decoding of the content, obtaining a symmetric key (step S76).

Then, the XML-encryption processor 9, using the symmetric key, encrypts the element specified by the <EncryptionTarget> element (step S77). More specifically, when the mode in the <EncryptionTarget> element 403 shown in FIG. 4 (hereinafter simply referred to as a mode) is ALL, the XML-encryption processor 9 encrypts the XML data, i.e., the entire body of the SOAP envelope. When the mode is ELEMENT, the XML-encryption processor 9 encrypts the content of the element specified by the <EncryptionTarget> element, including its content and child elements. When the mode is CONTENTS, the XML-encryption processor 9 encrypts the content specified by the content of the <EncryptionTarget> element and its child elements.

After performing encryption in step S77, the XML-encryption processor 9 converts the encrypted data into text by Base64 encoding (step S78). After step S78, the procedure proceeds to step S79 shown in FIG. 9 described next.

Figure 9:
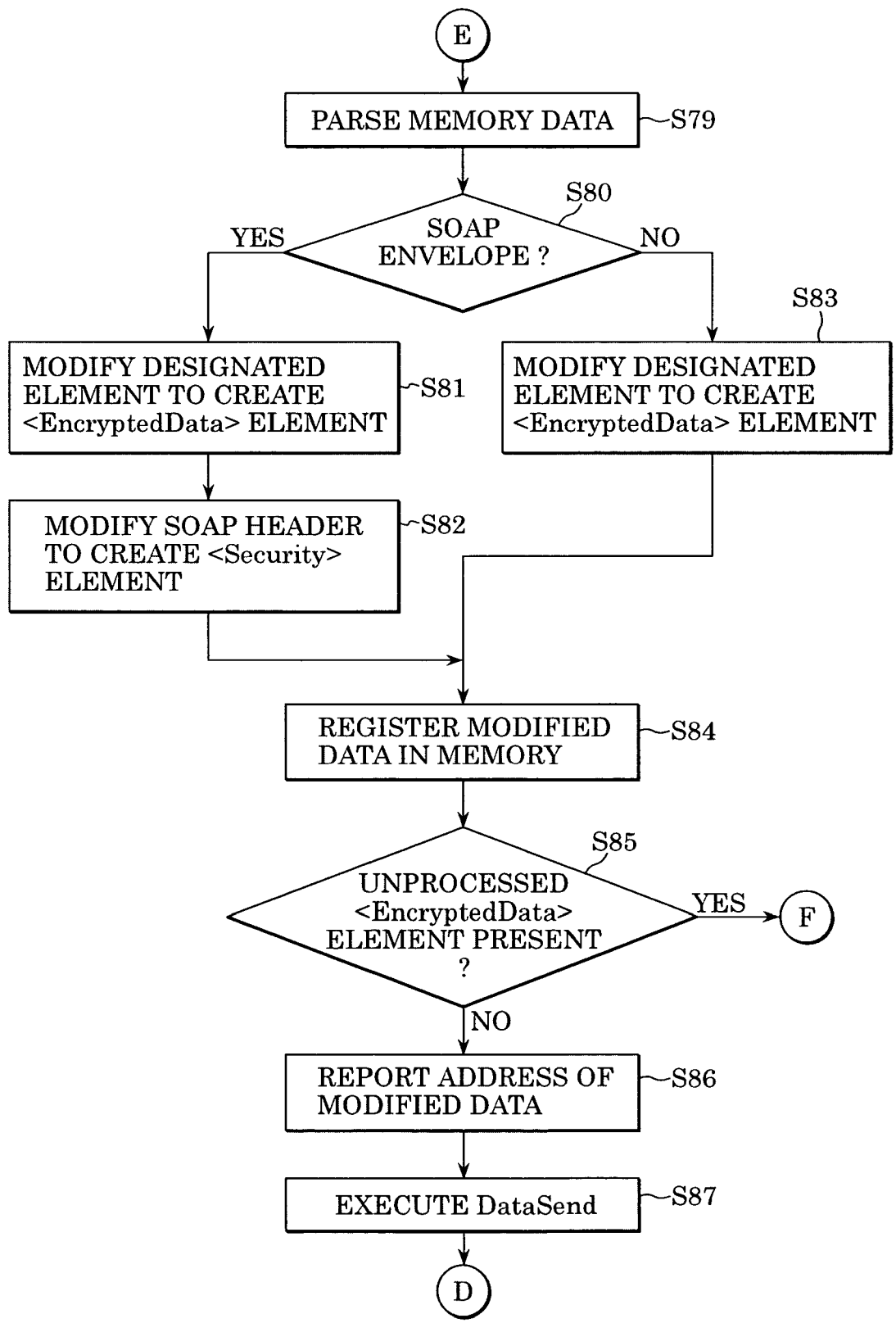
FIG. 9 is a flowchart of a procedure for modifying XML-encrypted XML data, executed by the XML-security processor.

Based on the result of executing XML encryption on the XML data, the XML-encryption processor 9 modifies the XML data according to the format defined by XML Encryption/WS-Security. FIG. 9 is a flowchart of a procedure for modifying XML data on which XML encryption has been executed, executed by the XML-encryption processor 9.

As shown in FIG. 9, the XML-encryption processor 9 parses the XML data registered on the memory via the memory controller 13 (step S79), and determines whether the XML data includes an element of a SOAP envelope (step S80). The XML data registered in the memory herein is the XML data shown in FIG. 7.

Since the XML data registered on the memory 14a, i.e., the MaintenanceRequest data in this case, includes a SOAP envelope (yes in step S80), the XML-encryption processor 9 modifies the XML data including the SOAP header and the body. Now, an example of modifying XML data by the XML-encryption processor 9 will be described with reference to FIG. 10.

FIG. 10 shows an example of the result of modifying XML data where <EncryptionTarget mode="CONTENTS"> in an XML script. The elements in FIG. 10 designated by the same numerals as in FIG. 7 have the same functions as those in FIG. 7 (described above). That is, the XML data shown in FIG. 10 is obtained by executing XML encryption on the XML data shown in FIG. 7 and modifying the result.

Referring to FIG. 10, the content of a <UserID> element 702 is changed into an <EncryptedData> element including encrypted data, and as a child element thereof, information representing a symmetric key encryption algorithm included in the XML script is written as an attribute of an <EncryptionMethod> element. In this embodiment, 3DES is used. Furthermore, as the content of a child element <CipherValue> of a subsequent <CipherData> element, the result of encrypted ID data included as the content of the <UserID> element is written.

The information regarding a public key (information for decrypting encrypted data) is added in a SOAP header according to WS-Security. More specifically, as shown in FIG. 10, an <EncryptedKey> element is written as a child element of a <security> element, and information representing an algorithm that is used with the public key (information for decrypting encrypted data) is written as an attribute of an <EncryptionMethod> element, which is a child element of the <EncryptedKey> element. Furthermore, information obtained by encrypting the symmetric key with the public key (information for verifying encrypted data) is written in a <CipherValue> element, which is a child element of the <CipherData> element.

In the procedure of modifying XML data into the XML data shown in FIG. 10, the XML-encryption processor 9 describes the result of encrypting ID data included as the content of the <UserID> element, as the content of the <CipherValue> element, which is a child element of the <CipherData> element (step S81). Then, the XML-encryption processor 9 adds information regarding the public key to the SOAP header according to WS-Security (step S82).

After the above procedure is completed, processing proceeds to step S84. When it is determined in step S80 that the XML data does not include a SOAP envelope (no in step S80), the XML-encryption processor 9 modifies the XML data of an element included in a device description file specified by the <EncryptionTarget> element (step S83). The procedure then proceeds to step S84. A specific example of processing in step S83 will be described later with reference to FIG. 14.

In step S84, the XML-encryption processor 9 records the modified XML data in the memory 14b via the memory controller 13. When the mode is ELEMENT or CONTENTS and another <EncryptedData> element exists in the XML script (yes in step S85), the procedure returns to step S72 in FIG. 8, and the XML-encryption processor 9 repeats steps S72 to S85 to modify a SOAP envelope including XML data.

When encryption and modification of XML data for all the <EncryptionTarget> elements have been completed (no in step S85), the XML-encryption processor 9 reports address information of the memory 14b where the modified XML data is stored to the DataSend processor 4 (step S86). Then, the DataSend processor 4 sends the transmission data stored in the memory 14b onto the protocol-stack processor 1 via the protocol-stack processor 1 (step S87). The procedure then returns to step S61 in FIG. 6.

As described above, the printer P1 is capable of executing XML encryption on maintenance information generated by the application processor 7 (the XML data shown in FIG. 7) and returning the result.

Next, the operation of the application processor 7 in a case where an application that processes device information written in XML is implemented on the printer P1 is described.

FIG. 11 is a flow chart showing the operation of the application processor 7 that processes device information written in XML. In this embodiment, the application processor 7 executes processing relating to the description phase in UPnP® v1 developed by UPnP® Forum.

An example of device description document (DDD) that is stored in the memory of the printer P1 is described next.

As shown in FIG. 12, the device description file is written in XML. Referring to FIG. 12, In the device description file, a <serviceList> element 1201, a <service> element 1202 as a child element of the <serviceList> element 1201, and <serviceType>, <serviceId>, <SCPDURL>, <controlURL>, and <eventSubURL> as child elements of the <service> element 1202, and contents of these elements are defined.

A UPnP®-enabled client device connected to the network obtains a URL of the device description file based on SSDP (Simple Service Discovery Protocol), which is a discovery protocol defined in UPnP® v1, and issues HTTP GET request so that the device description file will be transferred from the URL.

Referring to FIG. 11, the application processor 7 (UPnP®-Description processor) determines whether an HTTP GET request has been received (step S91). When it is determined that an HTTP GET request has been received (yes in step S91), the application processor 7 determines whether the request indicates a valid URL (step S92). When it is determined that the request does not indicate a valid URL (no in step S92), in order to report an error of the device description file request from the client device, the application processor 7 reports a relevant error code and applicationID that uniquely identifies the description phase processing application to the HTTP processor 5 (step S93).

Thus, the HTTP processor 5 creates an HTTP response header via the memory controller 13 and records it in the memory (step S95). Then, the HTTP processor 5 issues a DataSend request to the DataSend processor 4 (step S96). Then, the procedure proceeds to step S97. In this embodiment, applicationID and an address of the memory where the transmission data is stored are written as arguments of the DataSend request. In this case, the address in the memory where the HTTP response header data is recorded is set. The procedure then proceeds to step S98 described later with reference to FIG. 13.

When it is determined in step S92 that the request received indicates a valid URL (yes in step S92), the application processor 7 sends a relevant normal processing code, applicationID that uniquely identifies the description phase processing application, and a memory address where the device description file is registered, to the HTTP processor 5 (step S94).

Then, the HTTP processor 5 creates an HTTP response header on the memory via the memory controller 13, attaches a device description file as entity data thereof, and records the result (step S95). Then, the HTTP processor 5 issues a DataSend request to the DataSend processor 4 (step S96). In this embodiment, applicationID and a memory address where the transmission data is stored are written as arguments of the DataSend request. In this case, the HTTP response header data and an address of the device description file as entity data thereof is recorded on the memory are set.

In response to the request, the DataSend processor 4 writes arguments applicationID and MaintenanceRequest data to a predetermined memory area via the memory controller 13. When the writing is completed, the memory controller 13 notifies the XML-encryption processor 9 of the completion of the writing (step S97). The procedure then proceeds to step S98 described below with reference to FIG. 13.

Security processing that is executed by the XML-encryption processor 9 subsequent to the processing shown in FIG. 11 is described next.

Figure 13:
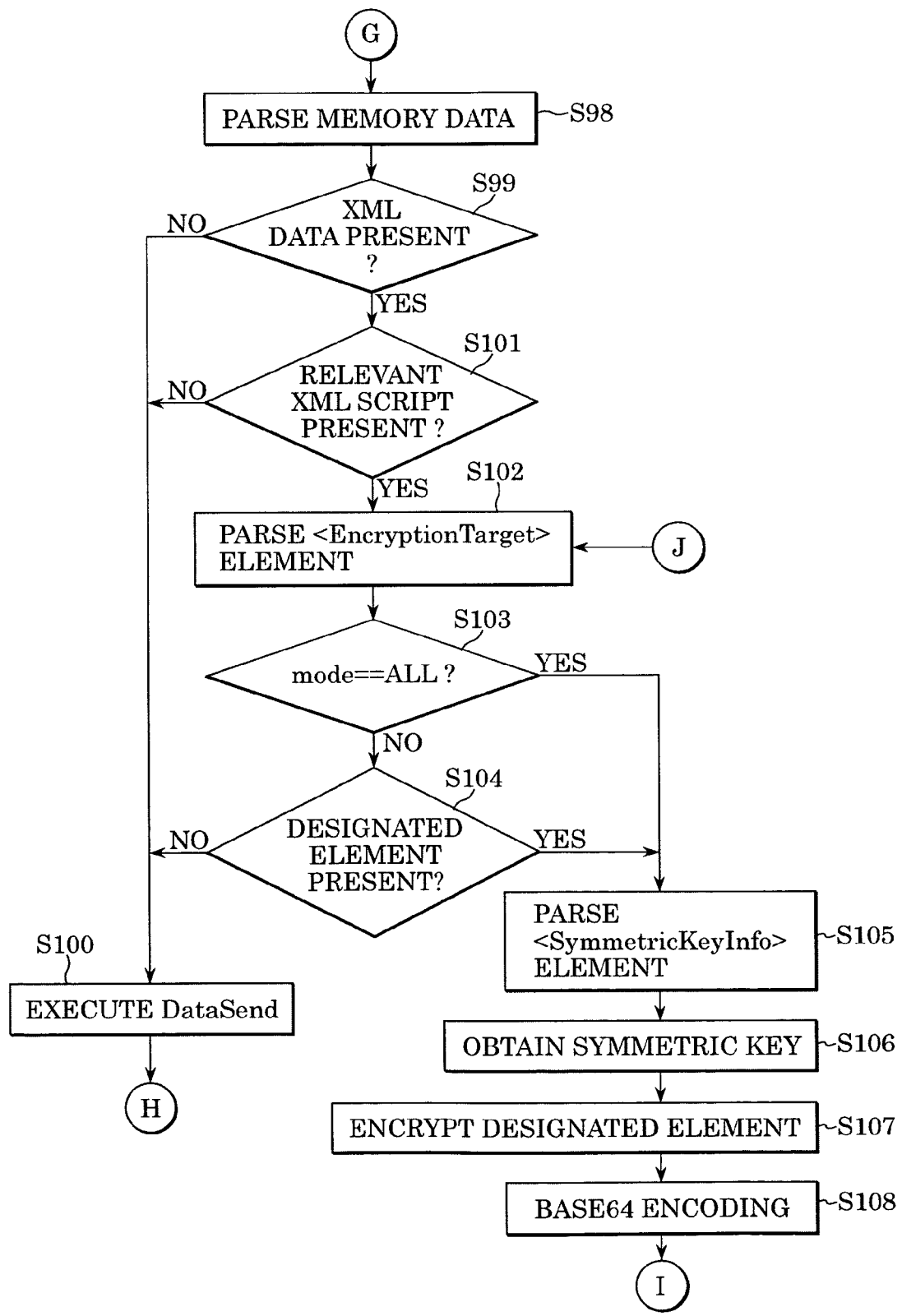
FIG. 13 is a flowchart of a procedure for security processing that is executed by the XML-security processor subsequent to the procedure shown in FIG. 11.

FIG. 13 shows security processing that is executed by the XML-encryption processor 9 subsequent to the processing shown in FIG. 11 and described above. Referring to FIG. 13, first, the XML-encryption processor 9 parses data at the memory address reported via the memory controller 13 (step S98). By the parsing, the XML-encryption processor 9 detects an XML declaration in the data to determine whether XML data is present (step S99).

When the XML-encryption processor 9 determines that XML data is absent (no in step S99), the DataSend processor 4 sends the transmission data stored on the memory onto the network N1 via the protocol-stack processor 1 (step S100). It is determined that XML data is absent at the reported address when the XML-encryption processor 9 determines that encryption is not needed, for example, when an error in which response data includes only HTTP header data is reported. After step S100, the processing returns to step S91 shown in FIG. 11.

On the other hand, when it is determined that XML data is present (yes in step S99), the XML-encryption processor 9 executes searching as to whether an XML script having the specified applicationID has been registered on the memory 14c via the memory controller 13, determining whether an XML script associated with the XML data is present (step S101). In this embodiment, the XML script shown in FIG. 4 is registered in the memory 14c.

When it is determined by the searching that an XML script having matching applicationID is not recorded on the memory 14c (no in step S101), the XML-encryption processor 9 determines that encryption is not needed. Then, the processing is returned to the DataSend processor 4. Then, the processing proceeds to step S100, in which the DataSend processor 4 sends the transmission data stored on the memory onto the protocol-stack processor 1 via the network N1. For example, an XML script is not recorded on the memory 14c when a device description file that is to be returned need not be encrypted. After step S100, the processing returns to step S91 shown in FIG. 11.

On the other hand, when it is determined by the searching in step S101 that an XML script having matching applicationID has been recorded (yes in step S101), the XML-encryption processor 9 parses the XML script to read the <EncryptionTarget> element (the element 403 in FIG. 4) and its content (step S102).

When it is determined by the parsing in step S102 that the mode is ELEMENT or CONTENTS (no in step S103), the XML-encryption processor 9 reads the encryption target element included as the content thereof, and executes searching as to whether a designated element is present in the device description file of the transmission data (step S104).

When it is determined by the searching that the designated element is not written in the device description file of the transmitted data (no in step S104), the XML-encryption processor 9 determines that encryption is not needed. Then, the processing is returned to the DataSend processor 4. Then, the processing proceeds to step S100, in which the DataSend processor 4 sends the transmission data stored on the memory onto the network N1 via the protocol-stack processor 1. For example, the element specified in the device description file is not written when a device description file that is to be returned need not be encrypted. After step S100, the processing returns to step S91 shown in FIG. 11.

When it is determined in step S104 that the designated element is written in the device description file of the transmission data (yes in step S104), or when the mode specified by the <EncryptionTarget> element written in the XML scrip is ALL (yes in step S103), the XML-encryption processor 9 reads the <KeyInfo> element (the element 404 in FIG. 4) written in the XML script and its content, and starts encryption (step S105).

Then, the XML-encryption processor 9 parses the <KeyValue> element (the element 407 in FIG. 4), which is a child element of the <SymmetricKeyInfo> element (the element 405 in FIG. 4), and executes Base64 decoding on the content to obtain a symmetric key (step S106).

Then, the XML-encryption processor 9, using the symmetric key, encrypts the element designated by the <EncryptionTarget> element (step S107). More specifically, when the mode in the <EncryptionTarget> element 403 in FIG. 4 (hereinafter simply referred to as a mode) is ALL, the XML-encryption processor 9 encrypts the XML data, i.e., the entire device description file. When the mode is ELEMENT, the XML-encryption processor 9 encrypts the element designated by the content of the <EncryptionTarget> element, including its content and child elements. When the mode is CONTENTS, the XML-encryption processor 9 encrypts the content and child elements of the element designated by the content of the <EncryptionTarget> element.

After the encryption in step S107, the XML-encryption processor 9 converts the encrypted data into text by Base64 encoding (step S108). After step S108, the processing proceeds to step S109 described below with reference to FIG. 14.

Figure 14:
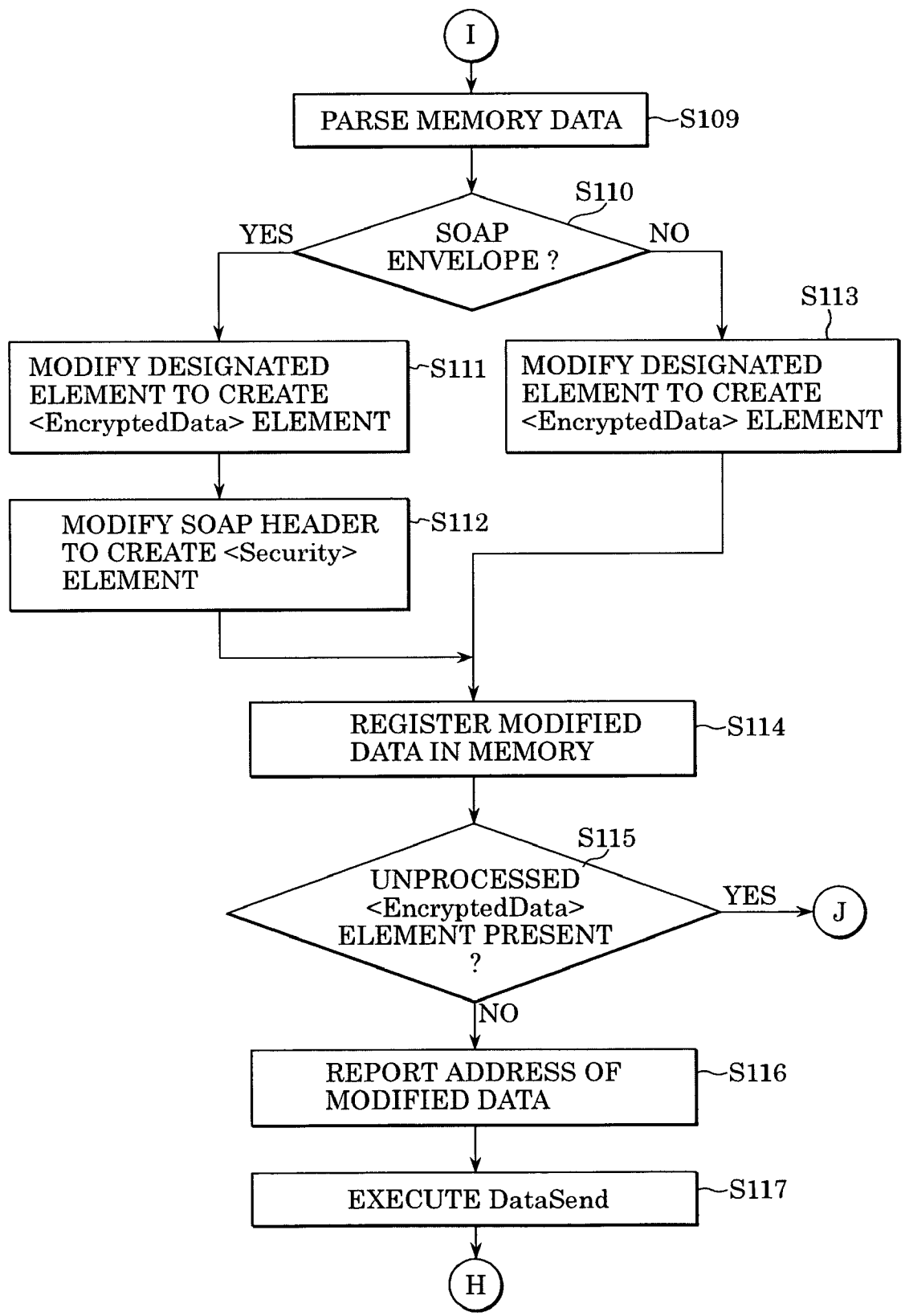
FIG. 14 is a flowchart of a procedure for modifying XML-encrypted XML data, executed by the XML-security processor.

Based on the result of executing XML encryption on the XML data, the XML-encryption processor 9 modifies the XML data according to the format based on the XML Encryption/WS-Security. FIG. 14 is a flowchart showing an operation of modifying XML-encrypted XML data, executed by the XML-encryption processor 9.

Referring to FIG. 14, first, the XML-encryption processor 9 parses the XML data registered on the memory via the memory controller 13 (step S109), and determines whether the XML data includes a SOAP envelope element (step S110).

In this embodiment, the XML data registered in the memory, i.e., the device description file in this case, does not include a SOAP envelope. Thus, it is determined that the XML data does not include a SOAP envelope element (no in step S110). The XML-encryption processor 9 modifies XML data of elements included in the device description file designated by the <EncryptionTarget> element (step S113).

An example of the result of modifying the device description file shown in FIG. 12 is described next. FIG. 15 shows an example of the result of modifying XML data in a case where <EncryptionTarget mode="ELEMENT"> and the <service> element 1202 is designated. That is, FIG. 15 shows XML data obtained by executing XML encryption on the XML data shown in FIG. 12 according to an XML script and modifying the result.

Referring to FIG. 15, the <service> element 1202, its child elements <serviceType>, <serviceId>, <SCPDURL>, <controlURL>, and <eventSubURL>, and contents of these elements are modified into an <EncryptionData> element 1501, and symmetric key algorithm information written in the XML script is written as an attribute of an <EncryptionMethod> element 1502. In this embodiment, 3DES is used as the symmetric key encryption algorithm.

Furthermore, as child elements of an <EncryptedKey> element 1503, the algorithm used with the public key is written as an attribute of an <EncryptionMethod> element 1504, and reference to data encrypted with the symmetric key is written as an attribute of a <ReferenceList> element 1505. The information representing the owner of the public key is written as the content of a <KeyName> element, which is a child element of a <KeyInfo> element 1506. Furthermore, the result of encrypting the symmetric key with the public key is written in a <CipherData> element 1507.

Furthermore, reference to the symmetric key encryption is written as an attribute of an <EncKeyReference> element, which is a child element of a <KeyInfo> element 1508. Furthermore, the result of encrypting the device description file is written as the content of a <CipherValue> element, which is a child element of a <CipherData> element 1509.

Referring back to FIG. 14, after step S113, processing proceeds to step S114 (described below).

When it is determined that the XML data includes elements of a SOAP envelope (yes in step S110), the XML-encryption processor 9 modifies the <service> element 1202 and the contents of the child elements of the <service> element 1202 by encryption (step S11). Then, information regarding the public key is added to a SOAP header based on the WS-Security (step S112). The processing then proceeds to step S114.

In step S114, the XML-encryption processor 9 records the modified XML data in the memory via the memory controller. When the mode of the <EncryptionTarget> element is ELEMENT or CONTENTS and another <EncryptedData> element is included in the XML script (yes in step S115), the processing returns to step S102 in FIG. 13, in which the XML-encryption processor 9 repeats steps S102 to S115 described above, modifying the device description file in the form of XML data.

When encryption and modification of XML data have been completed for all the <EncryptionTarget> elements (no in step S115), the XML-encryption processor 9 reports address information of the memory 14b where the modified XML data is stored to the DataSend processor 4 (step S116). Then, the DataSend processor 4 sends the transmission data stored in the memory 14*b* onto the network N1 via the protocol-stack processor 1 (step S117). The processing then returns to step S91 in FIG. 11.

As described above, the printer P1 in this embodiment is capable of encrypting XML data of the device description file generated by the application processor 7 (the XML data shown in FIG. 12) and returning the result.

Other Embodiments

In the embodiment described above, an XML script describing an encryption procedure is sent and registered to the XML-encryption processor 9 of the network N1 via the network N1 from an external device, e.g., the computer terminal C1 administered by the system administrator. Without limitation thereto, however, a URL of a server where an XML is registered may be registered to the XML-encryption processor 9 via the network N1 from the computer terminal C1 administered by the system administrator so that the XML-encryption processor 9 is allowed to download the XML script from the server at the URL and register the XML on its own memory.

Alternatively, a computer may be directly connected to the printer P1 to register an XML script to the XML-encryption processor 9. For example, a computer may be directly connected to the printer P1 via a local interface, such as a USB interface or an IEEE-1394 interface, to register an XML script to the XML-encryption processor 9 via the interface.

As another alternative, an XML script may be recorded on a recording medium, such as a CD-ROM, a CompactFlash® card, or a memory stick, so that the XML-encryption processor 9 of the printer P1 is allowed to read the XML script from the recording medium.

Furthermore, although an encryption procedure for each application is written in XML in the embodiment described above, without limitation, an encryption procedure may be written in any format that can be managed by the XML-encryption processor 9, such as other script languages or simple text data.

Furthermore, although information regarding an encryption procedure is written in an XML script in XML in the embodiment described above, without limitation thereto, an encryption procedure may be written using, for example, WSDL (Web Services Description Language), which is a language for describing interfaces for Web services.

FIG. 16 is a diagram showing an example of a description of a WSDL message element. Referring to FIG. 16, for each part written as a child element of the message element, whether encryption is executed, an <EncryptedData> element, and key-related information as its content are written as attributes thereof. Elements 1601 to 1602 and 1604 to 1612 shown in FIG. 16 have the same functions as the elements 401 to 402 and 404 to 412 shown in FIG. 4.

That is, when the application processor 7 has functions of Web services and functions based on an interface written in WSDL data obtained from a service provider, it is possible to execute encryption described in relation to the embodiment according to security processing information written in WSDL as shown in FIG. 16.

Furthermore, although an XML encryption procedure based on W3C XML Encryption is written in an XML script in the embodiment described above, without limitation thereto, for example, an XML signature procedure based on W3C XML Signature may be written. In that case, it is possible to write both an XML encryption procedure and an XML signature procedure in a common XML script, or to write these procedures in separate scripts.

Figure 17:
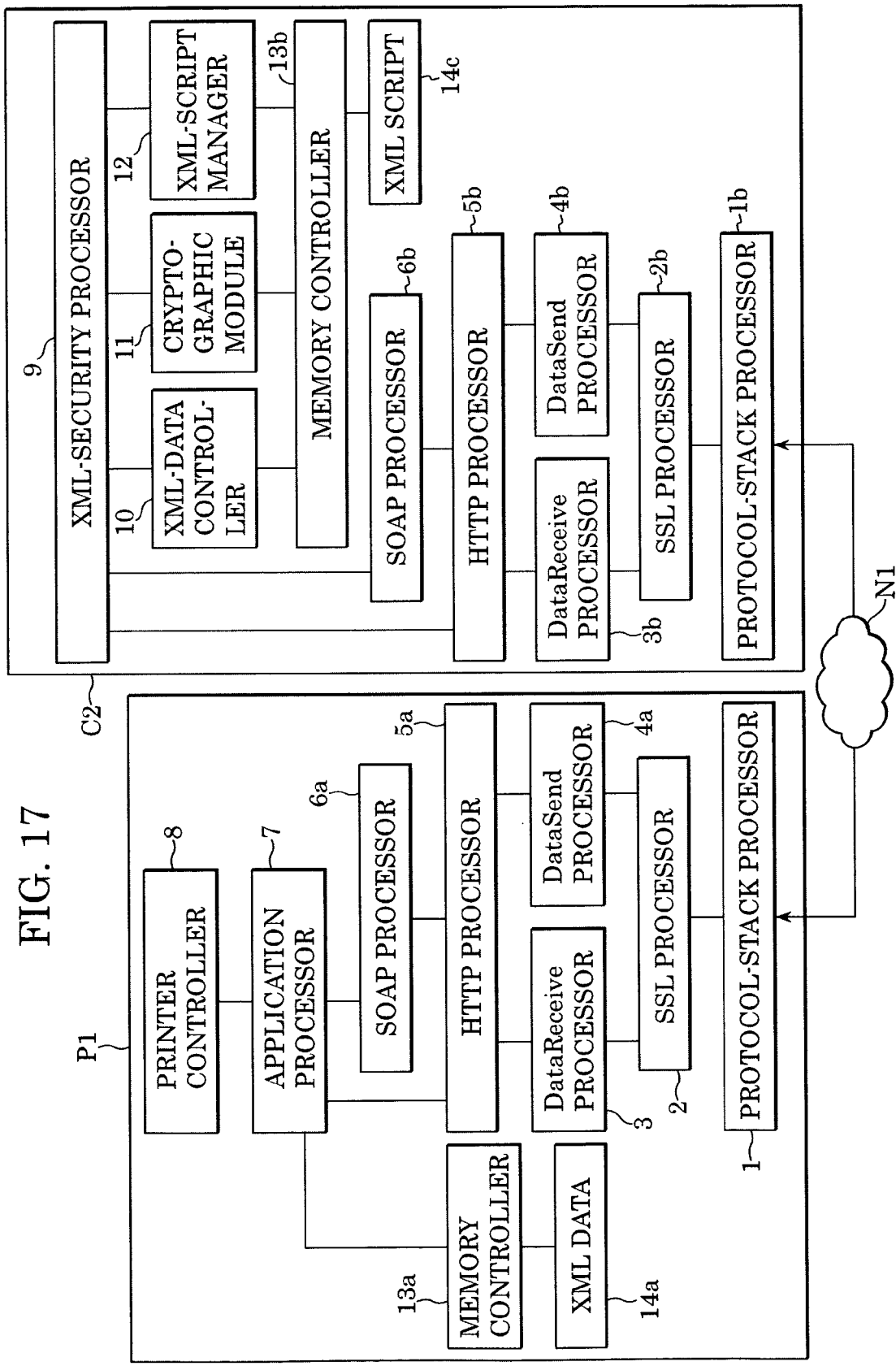
FIG. 17 is a block diagram showing the functional configuration of a printer and a computer terminal according to an embodiment of the present invention.

Furthermore, although the application processor 7 that uses XML and SOAP and the XML-encryption processor 9 are constructed independently of each other and are commonly mounted on the printer P1 in the embodiment described above, without limitation thereto, the XML-encryption processor 9 may be independently mounted on another network device on the network N1, for example, the computer terminal C2. FIG. 17 is a block diagram showing the functional configuration of the printer P1 and the computer terminal C2 according to another embodiment.

Components in FIG. 17 that are designated by the same numerals as in FIG. 1, such as 1 to 3, 7 to 12, and 14*a* and 14*c*, have equivalent functions, and descriptions thereof will not be repeated here. Components 4*a* and 5*a* in FIG. 17 have the equivalent functions as the components 4 and 5 in FIG. 1 except in that the components 4*a* and 5*a* do not communicate with a memory controller 13*a*. A component 6*a* in FIG. 17 have the equivalent function with the component 6 in FIG. 1 except in that the component 6*a* does not communicate with the XML-encryption processor 9. The memory controller 13*a* in the printer P1 controls the memory 14*a* for storing XML data. In the computer terminal C2, components 1*b* to 6*b* have equivalent functions as the components 1 to 3 and 4*a* to 6*a* of the printer P1. A memory controller 13*b* controls the memory 14*c* for storing an XML script.

In the system configuration shown in FIG. 17, XML data and XML data modified by security processing are exchanged between the printer P1 on which the application processor 7 is implemented and the computer terminal C2 on which the XML-encryption processor 9 is implemented so that functions equivalent to those of the printer P1 in the embodiment described above are achieved.

More specifically, in the configuration shown in FIG. 17, XML data generated by the application processor 7 is sent to the computer terminal C2, and the computer terminal C2 performs security processing and modification on the received XML data and returns the resulting XML data to the printer P1. Then, the printer P1 executes DataSend to send the received XML data onto the network N1.

As described above, in the print processing system according to the embodiment, the application processor 7 that supports at least one network service and the XML-encryption processor 9 that executes security processing on data output from the application processor 7 based on an XML script describing a security processing procedure are constructed independently of each other. Thus, it is possible to implement security processing functions easily without modifying applications. Furthermore, it is possible to implement network services with different security levels by registering, modifying, or deleting XML scripts describing security processing procedures.

Furthermore, it is possible to execute different XML digital signature procedures or XML encryption procedures simply by modifying XML scripts describing security processing procedures in accordance with an environment under which an application that implements a network service is used, security level, and system configuration. Thus, it is not needed to individually develop security processing functions in software for providing network services. This serves to reduce development costs considerably, and to allow an optimal security system to be introduced at an optimal timing.

Furthermore, although the components of the printer P1 in the embodiment described above achieve their functions by reading programs for achieving the functions from a memory and executing the programs by the CPU 101, without limitation thereto, the processing may be implemented partially or entirely by special hardware. Furthermore, the memory described above may be implemented by a non-volatile memory such as a magneto-optical disk or a flash memory, a read-only recording medium such as a CD-ROM (compact disk-read-only memory), a volatile memory other than a RAM (random access memory), or a computer-readable/writable recording medium that is implemented by a combination of these devices.

The programs for achieving the functions of the components of the printer P1 may be recorded on a computer-readable recording medium so that a computer system can read the programs recorded on the recording medium to execute processing. The "computer system" herein is to be construed as including an OS and hardware such as peripheral devices. More specifically, the present invention covers a case where the programs read from the recording medium are written to a memory of a function extending board mounted on the computer or a function extending unit connected to the computer and a CPU or the like of the function extending board or the function extending unit executes actual processing in part or entirely to achieve the functions of the embodiment described above.

The "computer-readable recording medium" refers to a portable medium such as a floppy disk, a magneto-optical disk, a ROM, or a CD-ROM, or a storage device such as a hard disk included in a computer system. Furthermore, the "computer-readable recording medium" may refer to a medium that temporarily holds the program, such as a volatile memory (RAM) in a computer system that acts as a server or a client when the program is transmitted via a network such as the Internet or a communication circuit such as a telephone circuit.

Furthermore, the programs may be transmitted via a transmission medium from a computer system in which the programs are stored in a storage device or the like to another computer system by wave of transmission waves in the transmission medium. The "transmission medium" herein refers to a medium that allows transmission of information, for example, a communication network such as the Internet or a communication circuit such as a telephone circuit.

The programs may implement a part of the functions described above. Furthermore, the programs may be difference files (difference programs) that achieve the functions in cooperation with programs already recorded on the computer system.

Furthermore, the present invention may be embodied in the form of a program product such as a computer-readable recording medium having the programs recorded thereon.

Although the embodiments of the present invention have been described in detail with reference to the drawings, specific constructions are not limited to the embodiments, and other constructions or the like that do not depart from the spirit of the present invention are covered.

While the present invention has been described with reference to exemplary embodiments, it is to be understood that the invention is not limited to the disclosed embodiments. On the contrary, the invention is intended to cover various modifications and equivalent arrangements included within the spirit and scope of the added claims. The scope of the following claims is to be accorded the broadest interpretation so as to encompass all such modifications and equivalent structures and functions.

This application claims priority from Japanese Patent Application No. 2004-167537 filed Jun. 4, 2004, which is hereby incorporated by reference herein.

What is claimed is:

1. An information processing apparatus comprising:
 a storage unit configured to store security processing information describing a security processing procedure that is to be applied to data generated by a service providing program, the security processing information including information identifying the service providing program and the data including data written in a structured language, wherein the security processing information can be read from or written to the storage unit by another program or user and includes element information specifying a part of the data written in the structured language and entirety-specifying information specifying the entire data written in the structured language, wherein an element to be encrypted can be specified when the part of the data is to be encrypted;
 a security processing unit configured to execute security processing to encrypt or give a digital signature to the data generated by the service providing program according to the security processing procedure described in the security processing information stored in the storage unit, wherein the security processing unit provides secure communications of the data generated by the service providing program with an external program, wherein the security processing unit security-processes the entire data or a specified element in the data based on the security processing information; and
 a modifying unit configured to modify the part of the data written in the structured language into data security-processed by the security processing unit in accordance with specification by the element information and modify the entire data security-processed by the security processing unit based on the entire-specifying information,
 wherein the security processing information further includes key information for defining an encryption key used in security processing of the data by the security processing unit according to the security processing procedure, and
 wherein the modifying unit adds information for decrypting the data encrypted by the security processing unit according to the securing processing procedure to the data written in the structured language.

2. The information processing apparatus according claim 1, further comprising:
 a communications unit configured to communicate with another apparatus via a network; and
 a transmission control unit configured to control transmission of the data obtained through the modification executed by the modifying unit to the another apparatus via the network.

3. The information processing apparatus according to claim 1,
 wherein the modifying unit modifies the part of the data written in the structured language into the security-processed data by using the encryption key.

4. The information processing apparatus according to claim 3, wherein the modifying unit comprises a parsing unit configured to parse the data to determine whether the data conforms to the Simple Object Access Protocol, wherein the modifying unit writes the processed data in a body defined by the Simple Object Access Protocol and writes the information for decrypting the processed data and the information for verifying the processed data in a header defined by the Simple Object Access Protocol when the parsing unit determines that the data conforms to the Simple Object Access Protocol.

5. The information processing apparatus according to claim 1, wherein the security processing information stored in the storage unit is information that is capable of being registered, updated, and deleted from outside via a network.

6. The information processing apparatus according to claim 1, wherein the security processing unit is configured to determine whether to execute the security processing procedure according to whether the security processing information associated with the data is stored in the storage unit.

7. The information processing apparatus according to claim 1, wherein the security processing unit comprises a determination unit configured to determine whether content of the security processing information is in accordance with content of the data, and the security processing unit determines whether to execute the security processing according to the determination by the determination unit.

8. The information processing apparatus according to claim 1, wherein the element information specifies the part of the data written in the structured language in accordance with a tag defined by the structured language.

9. An information processing method comprising:
using at least one processor to perform the following:
storing security processing information describing a security processing procedure associated with data generated by the service providing program in a storage unit, the security processing information including information identifying the service providing program and the data including data written in a structured language, wherein the security processing information includes element information specifying a part of the data written in the structured language and entirety-specifying information specifying the entire data written in the structured language, wherein an element to be encrypted can be specified when the part of the data is to be encrypted;
applying security processing to encrypt or give a digital signature to the data generated by the service providing program, according to the security processing procedure described in the security processing information stored in the storage unit, wherein the entire data or a specified element in the data is security-processed based on the security processing information;
modifying the part of the data written in the structured language into data security-processed by the security processing procedure in accordance with specification by the element information and modifying the entire data security-processed by the security processing procedure based on the entirety-specifying information; and
communicating the data from the service providing program with an external service providing program,
wherein the security processing information can be read from or written to the storage unit by another program or a user,
wherein the security processing information further includes key information for defining an encryption key used in security processing of the data according to the security processing procedure, and
wherein the data written in the structured language is modified by adding information for decrypting the data encrypted by security processing according to the securing processing procedure.

10. The information processing method according to claim 9, further comprising controlling transmission of the data obtained through modifying the part of the data to another apparatus via a network.

11. The information processing method according to claim 9,
wherein in modifying the part of the data, the part of the data written in the structured language is modified into the security-processed data by using the encryption key.

12. The information processing method according to claim 11, wherein modifying comprises:
parsing the data to determine whether the data conforms to the Simple Object Access Protocol; and
writing the processed data in a body defined by the Simple Object Access Protocol and writing the information for decrypting the processed data and the information for verifying the processed data in a header defined by the Simple Object Access Protocol when the parsing determines that the data conforms to the Simple Object Access Protocol.

13. The information processing method according to claim 9, wherein the security processing information is information that can be registered, updated, and deleted from outside via a network.

14. The information processing method according to claim 13, wherein applying security processing comprises determining whether to execute the security processing procedure according to whether the security processing information associated with the data is stored in the storage unit.

15. The information processing method according to claim 9, wherein applying security processing comprises:
determining whether a content of the security processing information is in accordance with a content of the data; and
determining whether to execute the security processing according to the determination.

16. The information processing method according to claim 9, wherein the element information specifies the part of the data written in the structured language in accordance with a tag specified by the structured language.

17. A non-transitory computer-readable storage medium having stored thereon a program for allowing a computer to execute an information processing method comprising:
storing security processing information describing a security processing procedure associated with data generated by the service providing program in a storage unit, the security processing information including information identifying the service providing program and the data including data written in a structured language, wherein the security processing information includes element information specifying a part of the data written in the structured language and entirety-specifying information specifying the entire data written in the structured language, wherein an element to be encrypted can be specified when the part of the data is to be encrypted;
applying security processing to encrypt or give a digital signature to the data generated by the service providing program, according to the security processing procedure described in the security processing information stored in the storage unit, wherein the entire data or a specified element in the data is security-processed based on the security processing information;
modifying the part of the data written in the structured language into data security-processed by the security processing procedure in accordance with specification by the element information and modifying the entire data security-processed by the security processing procedure based on the entirety-specifying information; and
communicating the data from the service providing program with an external service providing program,
wherein the security processing information can be read from or written to the storage unit by another program or a user,
wherein the security processing information further includes key information for defining an encryption key used in security processing of the data according to the security processing procedure, and
wherein the data written in the structured language is modified by adding information for decrypting the data encrypted by security processing according to the securing processing procedure.

* * * * *